United States Patent
Bremkens et al.

(10) Patent No.: US 10,766,522 B2
(45) Date of Patent: Sep. 8, 2020

(54) METHODS AND APPARATUS FOR CONTROLLING STEERING NIBBLE IN POSITION CONTROLLED STEERING SYSTEMS

(71) Applicant: Ford Global Technologies, LLC, Dearborn, MI (US)

(72) Inventors: Jan Bremkens, Straelen (DE); Daniel Slavin, Ysilanti, MI (US); Joseph Raad, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 338 days.

(21) Appl. No.: 15/813,907

(22) Filed: Nov. 15, 2017

(65) Prior Publication Data

US 2019/0144031 A1    May 16, 2019

(51) Int. Cl.
B62D 5/04    (2006.01)
B62D 15/02    (2006.01)

(52) U.S. Cl.
CPC .......... B62D 5/0472 (2013.01); B62D 5/046 (2013.01); B62D 5/0463 (2013.01); B62D 15/021 (2013.01)

(58) Field of Classification Search
None
See application file for complete search history.

(56) References Cited

U.S. PATENT DOCUMENTS

| 8,219,283 B2 | 7/2012 | Recker et al. |
| 8,632,096 B1 | 1/2014 | Quinn et al. |
| 2004/0148078 A1* | 7/2004 | Nakano .................. B60C 23/00 701/41 |
| 2015/0094912 A1* | 4/2015 | Sukaria ................ B62D 5/0463 701/41 |

FOREIGN PATENT DOCUMENTS

| CN | 104908807 | 9/2015 |
| KR | 100814758 | 3/2008 |
| KR | 20170075601 | 7/2017 |

\* cited by examiner

*Primary Examiner* — Tuan C To
*Assistant Examiner* — Kelly D Williams
(74) *Attorney, Agent, or Firm* — Ray Coppiellie; Hanley, Flight & Zimmerman, LLC

(57) ABSTRACT

Methods and apparatus for controlling steering nibble in position controlled steering systems are described. A controller is to determine actuator angle data based on steering wheel angle data associated with a steering wheel. The controller is also to determine nibble control angle data based on the steering wheel angle data. The controller is also to determine adjusted actuator angle data based on the actuator angle data and the nibble control angle data. The controller is also to generate a control signal based on the adjusted actuator angle data to apply a torque via an actuator of a position controlled steering system.

20 Claims, 16 Drawing Sheets

METHODS AND APPARATUS FOR CONTROLLING STEERING NIBBLE IN POSITION CONTROLLED STEERING SYSTEMS

FIELD OF THE DISCLOSURE

This disclosure relates generally to steering systems and, more particularly, to methods and apparatus for controlling steering nibble in position controlled steering systems.

BACKGROUND

Steering nibble is an undesirable rotational vibration experienced at a steering wheel and/or, more generally, at a steering system of a vehicle. Steering nibble typically occurs while the vehicle is traveling in a straight line. In some vehicles, steering nibble is caused by the chassis system responding to wheel force variations, which eventually feedback in the form of slight rotations in the steering system that are conveyed to the steering wheel. In many vehicles, steering nibble is caused by the presence of a front wheel imbalance or front wheel force variation. Steering nibble may also be caused by the presence of deformed brake disks rotors, whereby the resultant steering nibble is commonly characterized as brake judder.

Steering nibble is typically a first order phenomenon occurring at a frequency of one times (1×) the frequency of the front wheel speed. The magnitude of the steering nibble is maximized when the frequency of the front wheel speed aligns with the resonant frequency of the steering system, which typically ranges between 12.0 to 20.0 Hz. Steering nibble commonly results in customer (e.g., driver) dissatisfaction. It is accordingly advantageous to control (e.g., reduce and/or eliminate) occurrences of steering nibble within a steering system of a vehicle.

SUMMARY

Methods and apparatus for controlling steering nibble in position controlled steering systems are disclosed. In some examples, an apparatus is disclosed. In some disclosed examples, the apparatus comprises a controller. In some disclosed examples, the controller is to determine actuator angle data based on steering wheel angle data associated with a steering wheel. In some disclosed examples, the controller is also to determine nibble control angle data based on the steering wheel angle data. In some disclosed examples, the controller is also to determine adjusted actuator angle data based on the actuator angle data and the nibble control angle data. In some disclosed examples, the controller is also to generate a control signal based on the adjusted actuator angle data to apply a torque via an actuator of a position controlled steering system.

In some examples, a method is disclosed. In some disclosed examples, the method comprises determining, by executing one or more instructions via a controller, actuator angle data based on steering wheel angle data associated with a steering wheel. In some disclosed examples, the method further comprises determining, by executing one or more instructions via the controller, nibble control angle data based on the steering wheel angle data. In some disclosed examples, the method further comprises determining, by executing one or more instructions via the controller, adjusted actuator angle data based on the actuator angle data and the nibble control angle data. In some disclosed examples, the method further comprises generating, by executing one or more instructions via the controller, a control signal based on the adjusted actuator angle data to apply a torque via an actuator of a position controlled steering system.

In some examples, a non-transitory machine-readable storage medium comprising instructions is disclosed. In some disclosed examples, the instructions, when executed, cause a controller to determine actuator angle data based on steering wheel angle data associated with a steering wheel. In some disclosed examples, the instructions, when executed, cause the controller to determine nibble control angle data based on the steering wheel angle data. In some disclosed examples, the instructions, when executed, cause the controller to determine adjusted actuator angle data based on the actuator angle data and the nibble control angle data. In some disclosed examples, the instructions, when executed, cause the controller to generate a control signal based on the adjusted actuator angle data to apply a torque via an actuator of a position controlled steering system.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Undesirable rotational vibrations associated with steering nibble commonly result in customer (e.g., driver) dissatisfaction. Methods and apparatus for controlling steering nibble in electronic power assisted steering systems are known. For example, U.S. Pat. No. 8,219,283, filed on Aug. 8, 2008, titled "Active Steering Nibble Control Algorithm For Electric Steering Systems," and incorporated by reference herein in its entirety, discloses methods and apparatus for controlling steering nibble in electronic power assisted steering systems. The known methods and apparatus disclosed in U.S. Pat. No. 8,219,283 are based in part on the detection and/or determination of torque occurring within a steering wheel column and/or a steering wheel shaft of the disclosed electronic power assisted steering systems.

Vehicles implementing electronic power assisted steering systems commonly include one or more torque sensor(s) to facilitate the detection and/or measurement of torque occurring within a steering wheel column and/or a steering wheel shaft of the vehicle. In contrast, position controlled steering systems (e.g., active front steering systems, steer-by-wire steering systems, etc.) typically lack such torque sensor(s). The methods and apparatus disclosed herein advantageously control (e.g., reduce and/or eliminate) steering nibble in position controlled steering systems without the need for detecting and/or measuring torque occurring within a steering wheel column and/or a steering wheel shaft of the position controlled steering system of the vehicle.

Figure 1:
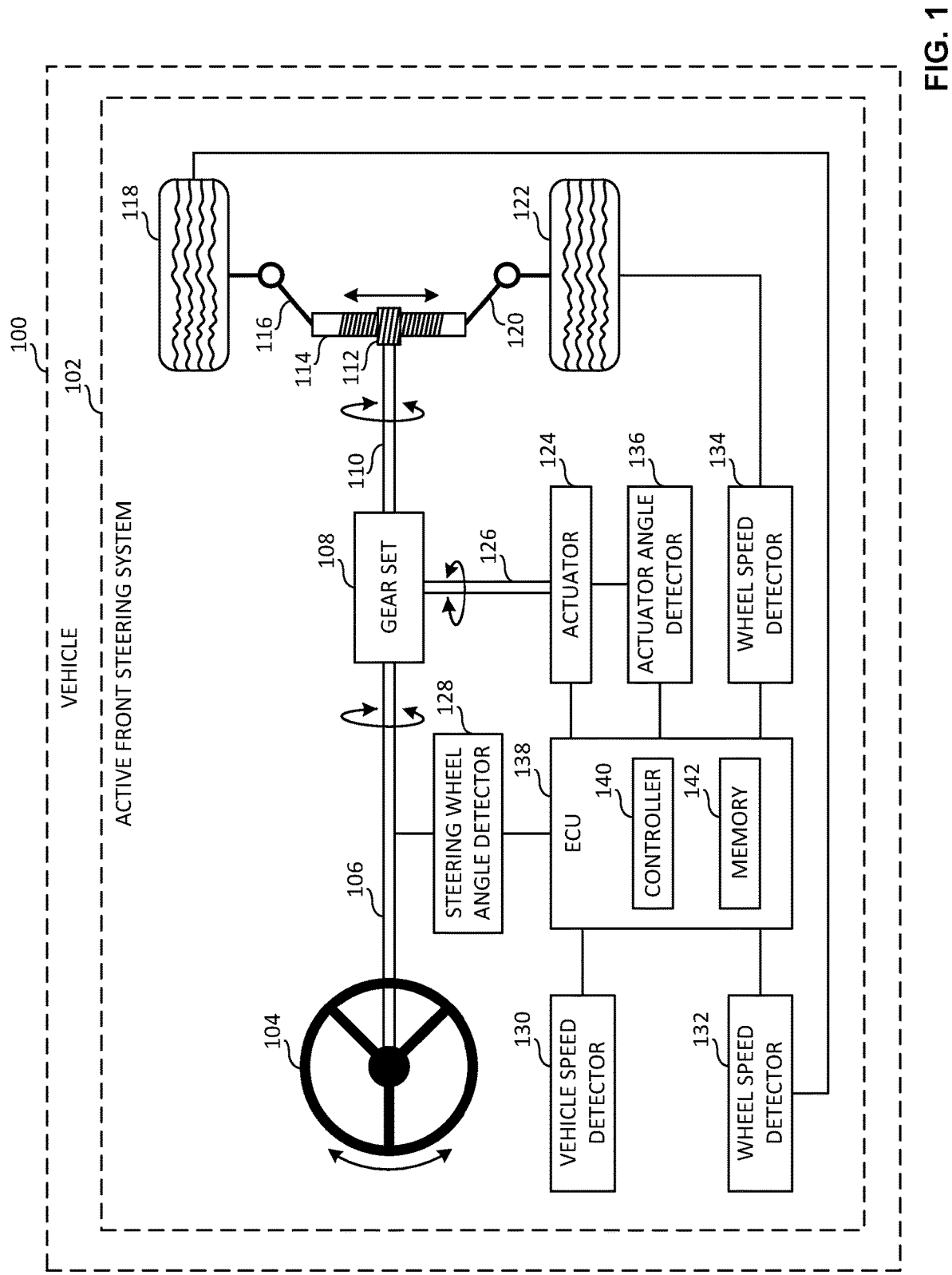
FIG. 1 is a block diagram of an example vehicle including an example active front steering system constructed in accordance with the teachings of this disclosure.

FIG. 1 is a block diagram of an example vehicle 100 including an example active front steering system 102 constructed in accordance with the teachings of this disclosure. The active front steering system 102 of FIG. 1 includes an example steering wheel 104, a first example steering shaft 106, an example gear set and/or gear set 108, a second example steering shaft 110, an example pinion 112, an example rack 114, a first example tie rod 116, a first example wheel 118, a second example tie rod 120, a second example wheel 122, an example actuator 124, an example actuator shaft 126, an example steering wheel angle detector 128, an example vehicle speed detector 130, a first example wheel speed detector 132, a second example wheel speed detector 134, an example actuator angle detector 136, and an example electronic control unit (ECU) 138 including an example controller 140 and an example memory 142. Respective ones of the steering wheel angle detector 128, the vehicle speed detector 130, the first wheel speed detector 132, the second wheel speed detector 134, and the actuator angle detector 136 of the active front steering system 102 of FIG. 1 are operatively coupled to the controller 140, the memory 142, and/or, more generally, the ECU 138 of the active front steering system 102 of FIG. 1 via a network such as a controller area network ("CAN").

The steering wheel 104 of FIG. 1 receives steering inputs from a driver of the vehicle 100 of FIG. 1. The first steering shaft 106 of FIG. 1 is coupled to the steering wheel 104 and to the gear set 108 of FIG. 1. For example, a first end of the first steering shaft 106 may be coupled to the steering wheel 104 such that the first steering shaft 106 rotates in response to rotation of the steering wheel 104, and vice-versa. A second end of the first steering shaft 106 located opposite the first end of the first steering shaft 106 may include and/or be coupled to a first gear (not shown) that engages, interfaces with, and or forms part of the gear set 108 of FIG. 1. The gear set 108 of FIG. 1 translates and/or conveys rotational motion from the first steering shaft 106 of FIG. 1 to the second steering shaft 110 of FIG. 1, and/or the actuator shaft 126 of FIG. 1, as further described below. In some examples, the gear set 108 of FIG. 1 may be implemented as a planetary gear set and/or a reduction gear set including any number of engaged and/or interfacing gears.

The second steering shaft 110 of FIG. 1 is coupled to the pinion 112 and to the gear set 108 of FIG. 1. For example, a first end of the second steering shaft 110 located opposite the pinion 112 may include and/or be coupled to a second gear (not shown) that engages, interfaces with, and or forms part of the gear set 108 of FIG. 1. A second end of the second steering shaft 110 located opposite the first end of the second steering shaft 110 may be coupled to the pinion 112 such that the pinion 112 rotates in response to rotation of the second steering shaft 110, and vice-versa. In some examples, the pinion 112 may be integrally formed with the second steering shaft 110.

The pinion 112 of FIG. 1 engages and/or interfaces with the rack 114 of FIG. 1 such that the rack 114 translates in response to rotation of the pinion 112. The first wheel 118 of FIG. 1 is coupled to a first end of the rack 114 via the first tie rod 116 of FIG. 1, and the second wheel 122 of FIG. 1 is coupled to a second end of the rack 114 opposite the first end of the rack 114 via the second tie rod 120 of FIG. 1. Translational movement of the rack 114 of FIG. 1 causes the first wheel 118 and the second wheel 122 of FIG. 1 to be respectively steered via corresponding ones of the first tie rod 116 and the second tie rod 120 to adjust a direction of travel of the vehicle 100 of FIG. 1 (e.g., to turn the vehicle 100).

The actuator 124 of FIG. 1 may be implemented by an electric motor. In the illustrated example of FIG. 1, the actuator 124 provides powered assistance (e.g., power-assisted torque and/or power-assisted momentum) to the gear set 108 of the active front steering system 102 of FIG. 1 to control the ease with which the gears of the gear set 108 may be rotated and/or otherwise moved by an occupant (e.g., a driver) of the vehicle 100 of FIG. 1 operating the steering wheel 104 of the vehicle 100 of FIG. 1. The actuator 124 of FIG. 1 is controlled via one or more control signal(s) generated by the controller 140 of the ECU 138 of FIG. 1, as further described below. In some examples, the actuator 124 of FIG. 1 may be actuated, activated and/or otherwise operated via the controller 140 of FIG. 1 to influence the translation, conveyance and/or transmission of rotational motion between the first steering shaft 106 and the second steering shaft 110 of FIG. 1.

The actuator shaft 126 of FIG. 1 is coupled to the actuator 124 and to the gear set 108 of FIG. 1. For example, a first end of the actuator shaft 126 may be coupled to the actuator 124 such that the actuator shaft 126 rotates in response to being rotatably driven via the actuator 124. A second end of the actuator shaft 126 located opposite the first end of the actuator shaft 126 may include and/or be coupled to a third gear (not shown) that engages, interfaces with, and or forms part of the gear set 108 of FIG. 1. In some examples, the actuator shaft 126 may be integrally formed with the actuator 124.

In the illustrated example of FIG. 1, steering nibble may be transferred, conveyed and/or transmitted from the first wheel 118 and/or the second wheel 122 of FIG. 1 to the steering wheel 104 of FIG. 1 via the first tie rod 116, the second tie rod 120, the rack 114, the pinion 112, the second steering shaft 110, the gear set 108, and the first steering shaft 106 of FIG. 1. As further described below, the controller 140 of FIG. 1 may execute and/or otherwise implement a nibble control process to reduce (e.g. eliminate) steering nibble that would otherwise be transferred, conveyed and/or transmitted to the steering wheel 104 of FIG. 1.

The steering wheel angle detector 128 of FIG. 1 senses, measures and/or detects the steering wheel angle (e.g., steering wheel angle data and/or a steering wheel angle signal) of the steering wheel 104 and/or the first steering shaft 106 of FIG. 1. The steering wheel angle detector 128 of FIG. 1 is operatively coupled to the controller 140, the memory 142, and/or, more generally, the ECU 138 of FIG. 1. The steering wheel angle detector 128 is also operatively coupled to the steering wheel 104 and/or the first steering shaft 106 of FIG. 1. In some examples, the steering wheel angle detector 128 may be mounted on and/or otherwise structurally coupled to the steering wheel 104 and/or the first steering shaft 106 of FIG. 1.

Steering wheel angle data corresponding to the steering wheel angles (e.g., a steering wheel angle signal) of the steering wheel 104 and/or the first steering shaft 106 of FIG. 1 sensed, measured and/or detected by the steering wheel angle detector 128 of FIG. 1 may be stored in the memory 142 of FIG. 1. In some examples, the steering wheel angle data may be accessed by the controller 140 of FIG. 1 from the memory 142 of FIG. 1. In other examples, the steering wheel angle data may be accessed by the controller 140 of FIG. 1 directly from the steering wheel angle detector 128 of FIG. 1. In some examples, the steering wheel angle detector 128 of FIG. 1 may constantly sense and/or constantly detect the steering wheel angle data. In other examples, the steering wheel angle detector 128 of FIG. 1 may periodically sense and/or periodically detect the steering wheel angle data based on a timing interval and/or a sampling frequency implemented via the controller 140 of FIG. 1.

The vehicle speed detector 130 of FIG. 1 senses, measures and/or detects the vehicle speed (e.g., vehicle speed data and/or a vehicle speed signal) of the vehicle 100 of FIG. 1. The vehicle speed detector 130 of FIG. 1 is operatively coupled to the controller 140, the memory 142, and/or, more generally, the ECU 138 of FIG. 1. The vehicle speed detector 130 is also operatively coupled to one or more components of the vehicle 100 that facilitate a measurement of vehicle speed. For example, the vehicle speed detector 130 may be mounted on and/or otherwise structurally coupled to a transmission and/or transaxle (not shown) of the vehicle 100 of FIG. 1.

Vehicle speed data corresponding to the vehicle speeds (e.g., a vehicle speed signal) of the vehicle 100 of FIG. 1 sensed, measured and/or detected by the vehicle speed detector 130 of FIG. 1 may be stored in the memory 142 of FIG. 1. In some examples, the vehicle speed data may be accessed by the controller 140 of FIG. 1 from the memory 142 of FIG. 1. In other examples, the vehicle speed data may be accessed by the controller 140 of FIG. 1 directly from the vehicle speed detector 130 of FIG. 1. In some examples, the vehicle speed detector 130 of FIG. 1 may constantly sense and/or constantly detect the vehicle speed data. In other examples, the vehicle speed detector 130 of FIG. 1 may periodically sense and/or periodically detect the vehicle speed data based on a timing interval and/or a sampling frequency implemented via the controller 140 of FIG. 1.

While the vehicle speed detector 130 is shown in the example of FIG. 1 as being integrated into the active front steering system 102 of FIG. 1, the vehicle speed detector 130 may alternatively be located separately from the active front steering system 102 (e.g., at a remote location within the vehicle 100 of FIG. 1). In examples where the vehicle speed detector 130 is located remotely from the active front steering system 102, the vehicle speed data sensed and/or detected by the vehicle speed detector 130 may be transmitted to and/or otherwise made accessible to the controller 140 of the active front steering system 102 of FIG. 1 via a network such as a controller area network (CAN).

The first wheel speed detector 132 of FIG. 1 senses, measures and/or detects the wheel speed (e.g., wheel speed data and/or a wheel speed signal) of the first wheel 118 of FIG. 1. The first wheel speed detector 132 of FIG. 1 is operatively coupled to the controller 140, the memory 142, and/or, more generally, the ECU 138 of FIG. 1. The first wheel speed detector 132 is also operatively coupled to the first wheel 118 of FIG. 1. In some examples, the first wheel speed detector 132 may be mounted on and/or otherwise structurally coupled to the first wheel 118 of FIG. 1.

Wheel speed data corresponding to the wheel speeds (e.g., a wheel speed signal) of the first wheel 118 of FIG. 1 sensed, measured and/or detected by the first wheel speed detector 132 of FIG. 1 may be stored in the memory 142 of FIG. 1. In some examples, the wheel speed data may be accessed by the controller 140 of FIG. 1 from the memory 142 of FIG. 1. In other examples, the wheel speed data may be accessed by the controller 140 of FIG. 1 directly from the first wheel speed detector 132 of FIG. 1. In some examples, the first wheel speed detector 132 of FIG. 1 may constantly sense and/or constantly detect the wheel speed data associated with the first wheel 118 of FIG. 1. In other examples, the first wheel speed detector 132 of FIG. 1 may periodically sense and/or periodically detect the wheel speed data associated with the first wheel 118 of FIG. 1 based on a timing interval and/or a sampling frequency implemented via the controller 140 of FIG. 1.

The second wheel speed detector 134 of FIG. 1 senses, measures and/or detects the wheel speed (e.g., wheel speed data and/or a wheel speed signal) of the second wheel 122 of FIG. 1. The second wheel speed detector 134 of FIG. 1 is operatively coupled to the controller 140, the memory 142, and/or, more generally, the ECU 138 of FIG. 1. The second wheel speed detector 134 is also operatively coupled to the second wheel 122 of FIG. 1. In some examples, the second wheel speed detector 134 may be mounted on and/or otherwise structurally coupled to the second wheel 122 of FIG. 1.

Wheel speed data corresponding to the wheel speeds (e.g., a wheel speed signal) of the second wheel 122 of FIG. 1 sensed, measured and/or detected by the second wheel speed detector 134 of FIG. 1 may be stored in the memory 142 of FIG. 1. In some examples, the wheel speed data may be accessed by the controller 140 of FIG. 1 from the memory 142 of FIG. 1. In other examples, the wheel speed data may be accessed by the controller 140 of FIG. 1 directly from the second wheel speed detector 134 of FIG. 1. In some examples, the second wheel speed detector 134 of FIG. 1 may constantly sense and/or constantly detect the wheel speed data associated with the second wheel 122 of FIG. 1. In other examples, the second wheel speed detector 134 of FIG. 1 may periodically sense and/or periodically detect the wheel speed data associated with the second wheel 122 of FIG. 1 based on a timing interval and/or a sampling frequency implemented via the controller 140 of FIG. 1.

The actuator angle detector 136 of FIG. 1 senses, measures and/or detects the actuator angle (e.g., actuator angle data and/or an actuator angle signal) of the actuator 124 and/or the actuator shaft 126 of FIG. 1. The actuator angle detector 136 of FIG. 1 is operatively coupled to the controller 140, the memory 142, and/or, more generally, the ECU 138 of FIG. 1. The actuator angle detector 136 is also operatively coupled to the actuator 124 and/or the actuator shaft 126 of FIG. 1. In some examples, the actuator angle detector 136 may be mounted on and/or otherwise structurally coupled to the actuator 124 and/or the actuator shaft 126 of FIG. 1.

Actuator angle data corresponding to the actuator angles (e.g., an actuator angle signal) of the actuator 124 and/or the actuator shaft 126 of FIG. 1 sensed, measured and/or detected by the actuator angle detector 136 of FIG. 1 may be stored in the memory 142 of FIG. 1. In some examples, the actuator angle data may be accessed by the controller 140 of FIG. 1 from the memory 142 of FIG. 1. In other examples, the actuator angle data may be accessed by the controller 140 of FIG. 1 directly from the actuator angle detector 136 of FIG. 1. In some examples, the actuator angle detector 136 of FIG. 1 may constantly sense and/or constantly detect the actuator angle data. In other examples, the actuator angle detector 136 of FIG. 1 may periodically sense and/or periodically detect the actuator angle data based on a timing interval and/or a sampling frequency implemented via the controller 140 of FIG. 1.

The controller 140 of FIG. 1 may be implemented by a semiconductor device such as a processor, microprocessor, controller or microcontroller. In some examples, the controller 140 may be implemented as an active front steering position controller. In the illustrated example of FIG. 1, the controller 140 manages and/or controls the actuator 124 of FIG. 1 based on data and/or signals received, obtained and/or accessed by the controller 140 from the steering wheel angle detector 128, the vehicle speed detector 130, the first wheel speed detector 132, the second wheel speed detector 134, the actuator angle detector 136, and/or, more generally, the active front steering system 102 of FIG. 1.

The controller 140 of FIG. 1 determines steering wheel angles of the steering wheel 104 and/or the first steering shaft 106 of FIG. 1 based on the steering wheel angle data sensed and/or detected by the steering wheel angle detector 128 of FIG. 1. The controller 140 of FIG. 1 determines vehicle speeds of the vehicle 100 of FIG. 1 based on the vehicle speed data sensed and/or detected by the vehicle speed detector 130 of FIG. 1. The controller 140 of FIG. 1 determines wheel speeds of the first wheel 118 of FIG. 1 based on the wheel speed data sensed and/or detected by the first wheel speed detector 132 of FIG. 1. The controller 140 of FIG. 1 determines wheel speeds of the second wheel 122 of FIG. 1 based on the wheel speed data sensed and/or detected by the second wheel speed detector 134 of FIG. 1. The controller 140 of FIG. 1 determines actuator angles of the actuator 124 and/or the actuator shaft 126 of FIG. 1 based on the actuator angle data sensed and/or detected by the actuator angle detector 136 of FIG. 1.

Figure 2:
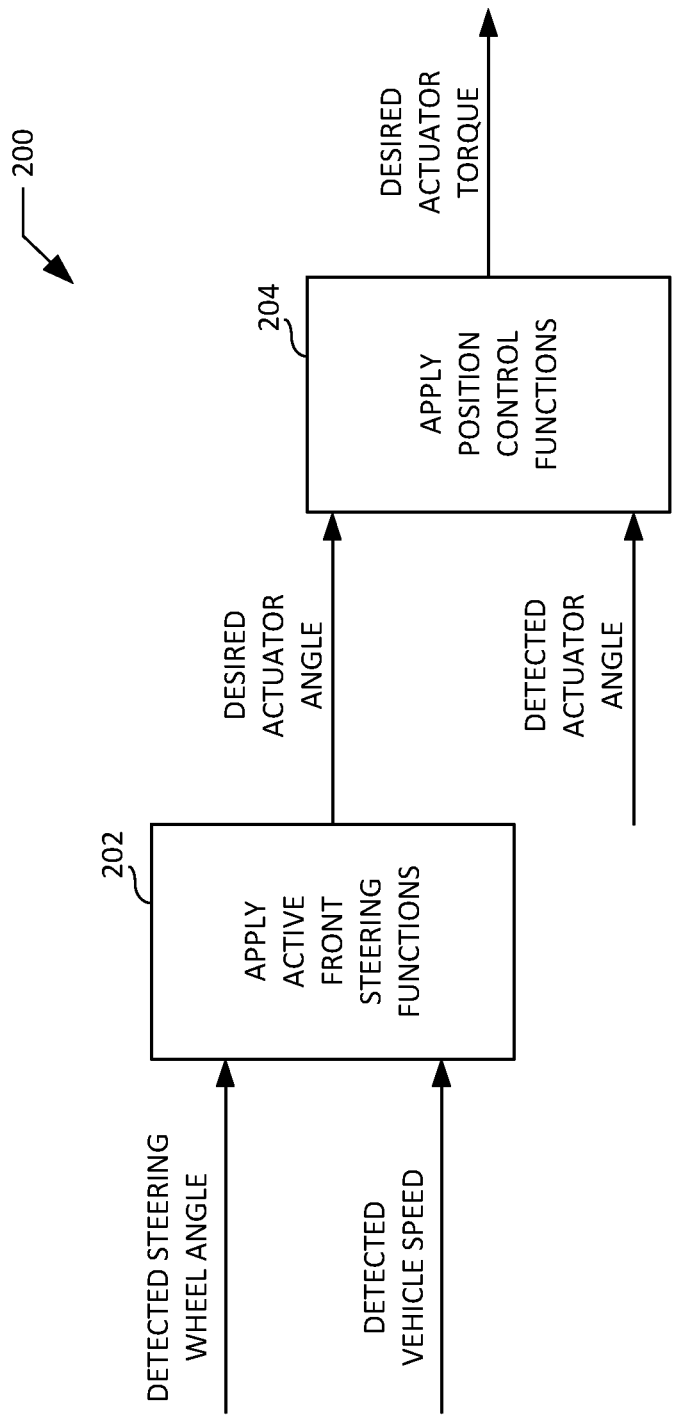
FIG. 2 is an example process diagram to be implemented by the example controller of FIG. 1 to determine a desired actuator torque for the example actuator of FIG. 1.

In some examples, the controller 140 of FIG. 1 determines a desired actuator torque (e.g., desired actuator torque data) to be applied by the actuator 124 of FIG. 1. For example, FIG. 2 illustrates an example process diagram 200 to be implemented by the example controller 140 of FIG. 1 to determine a desired actuator torque for the example actuator 124 of FIG. 1. When implementing the illustrated process diagram 200 of FIG. 2, the controller 140 of FIG. 1 determines a desired actuator angle (e.g., desired actuator angle data) by applying active front steering functions (e.g., variable gear ratios associated with the gear set 108 of the active front steering system 102) to steering wheel angle data sensed and/or detected via the steering wheel angle detector 128 of FIG. 1 (e.g., detected steering wheel angle data), and to vehicle speed data sensed and/or detected via the vehicle speed detector 130 of FIG. 1 (e.g., detected vehicle speed data) (block 202). In response to determining the desired actuator angle, the controller 140 of FIG. 1 determines the desired actuator torque by applying position control functions (e.g., position-to-torque correlation data) to the desired actuator angle data and to actuator angle data sensed and/or detected via the actuator angle detector 136 of FIG. 1 (e.g., detected actuator angle data) (block 204).

In response to determining the desired actuator torque (e.g., via the process diagram 200 of FIG. 2), the controller 140 of FIG. 1 generates one or more control signal(s) to adjust the actuator 124 of FIG. 1 based on the desired actuator torque. The actuator 124 of FIG. 1 applies the desired actuator torque in response to the generated control signal(s). In the illustrated example of FIG. 2, the desired actuator angle data used to determine the desired actuator torque is not compensated and/or adjusted to account for steering nibble that may be occurring at the steering wheel 104 of the active front steering system 102 of FIG. 1. In other words, the process diagram 200 of FIG. 2 does not incorporate a nibble control process.

Figure 3:
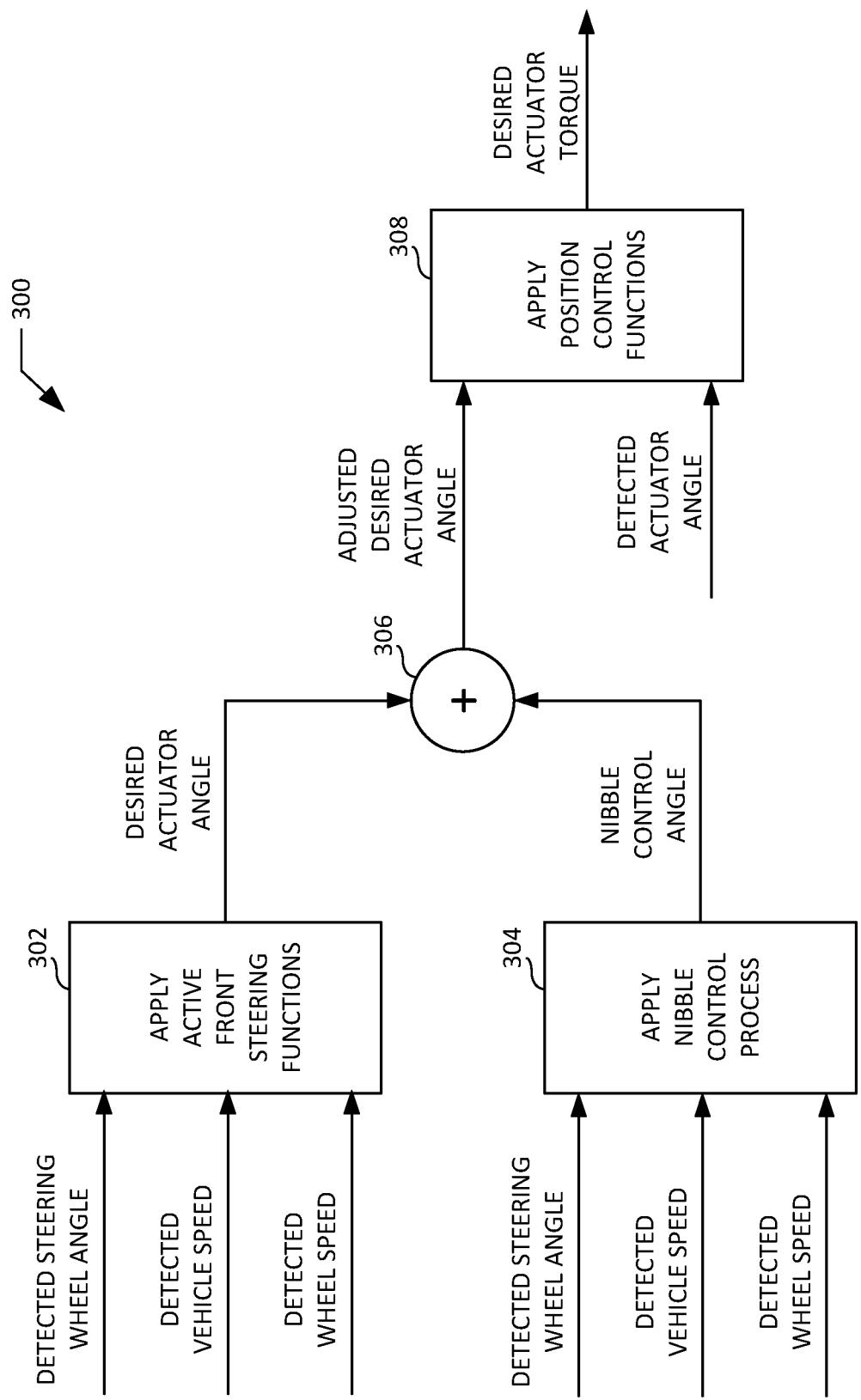
FIG. 3 is an example process diagram including an example nibble control process to be implemented by the example controller of FIG. 1 to determine a desired actuator torque for the example actuator of FIG. 1.

In some examples, the controller 140 of FIG. 1 determines a desired actuator torque (e.g., desired actuator torque data) for the actuator 124 of FIG. 1 based in part on a nibble control process (e.g., a nibble control algorithm). For example, FIG. 3 illustrates an example process diagram 300 including an example nibble control process to be implemented by the example controller 140 of FIG. 1 to determine a desired actuator torque for the example actuator 124 of FIG. 1. When implementing the illustrated process diagram 300 of FIG. 3, the controller 140 of FIG. 1 determines a desired actuator angle (e.g., desired actuator angle data) by applying active front steering functions (e.g., variable gear ratios associated with the gear set 108 of the active front steering system 102) to steering wheel angle data sensed and/or detected via the steering wheel angle detector 128 of FIG. 1 (e.g., detected steering wheel angle data), and to vehicle speed data sensed and/or detected via the vehicle speed detector 130 of FIG. 1 (e.g., detected vehicle speed data) (block 302). The controller 140 of FIG. 1 may alternatively determine desired actuator angle data by applying active front steering functions to detected steering wheel angle data, and to wheel speed data sensed and/or detected via the first wheel speed detector 132 and/or the second wheel speed detector 134 of FIG. 1 (e.g., detected wheel speed data) (block 302).

When implementing the illustrated process diagram 300 of FIG. 3, the controller 140 of FIG. 1 further determines a nibble control angle (e.g., nibble control angle data) by applying the nibble control process to the detected steering wheel angle data, and to wheel speed data sensed and/or detected via the first wheel speed detector 132 and/or the second wheel speed detector 134 of FIG. 1 (e.g., detected wheel speed data) (block 304). In the absence of the detected wheel speed data, the controller 140 of FIG. 1 may alternatively determine the nibble control angle by applying the nibble control process to the detected steering wheel angle data and to the detected vehicle speed data (block 304). The controller 140 of FIG. 1 determines an adjusted desired actuator angle (e.g., adjusted desired actuator angle data) by summing the desired actuator angle data and the nibble control angle data (block 306). In response to determining the adjusted desired actuator angle, the controller 140 of FIG. 1 determines the desired actuator torque by applying position control functions (e.g., position-to-torque correlation data) to the adjusted desired actuator angle data and to actuator angle data sensed and/or detected via the actuator angle detector 136 of FIG. 1 (e.g., detected actuator angle data) (block 308).

In response to determining the desired actuator torque (e.g., via the process diagram 300 of FIG. 3), the controller 140 of FIG. 1 generates one or more control signal(s) to adjust the actuator 124 of FIG. 1 based on the desired actuator torque. The actuator 124 of FIG. 1 applies the desired actuator torque in response to the generated control signal(s). In the illustrated example of FIG. 3, the adjusted desired actuator angle data used to determine the desired actuator torque is compensated and/or adjusted via the nibble control process to account for steering nibble occurring at the steering wheel 104 of the active front steering system 102 of FIG. 1. In other words, the process diagram 300 of FIG. 3 incorporates a nibble control process to control (e.g., reduce or eliminate) steering nibble associated with the active front steering system 102 of FIG. 1. Example operational aspects and/or sub-processes of the nibble control process of FIG. 3 are further described below in connection with FIGS. 4A, 4B, 5-9, and 10A-10C.

Figure 4A:
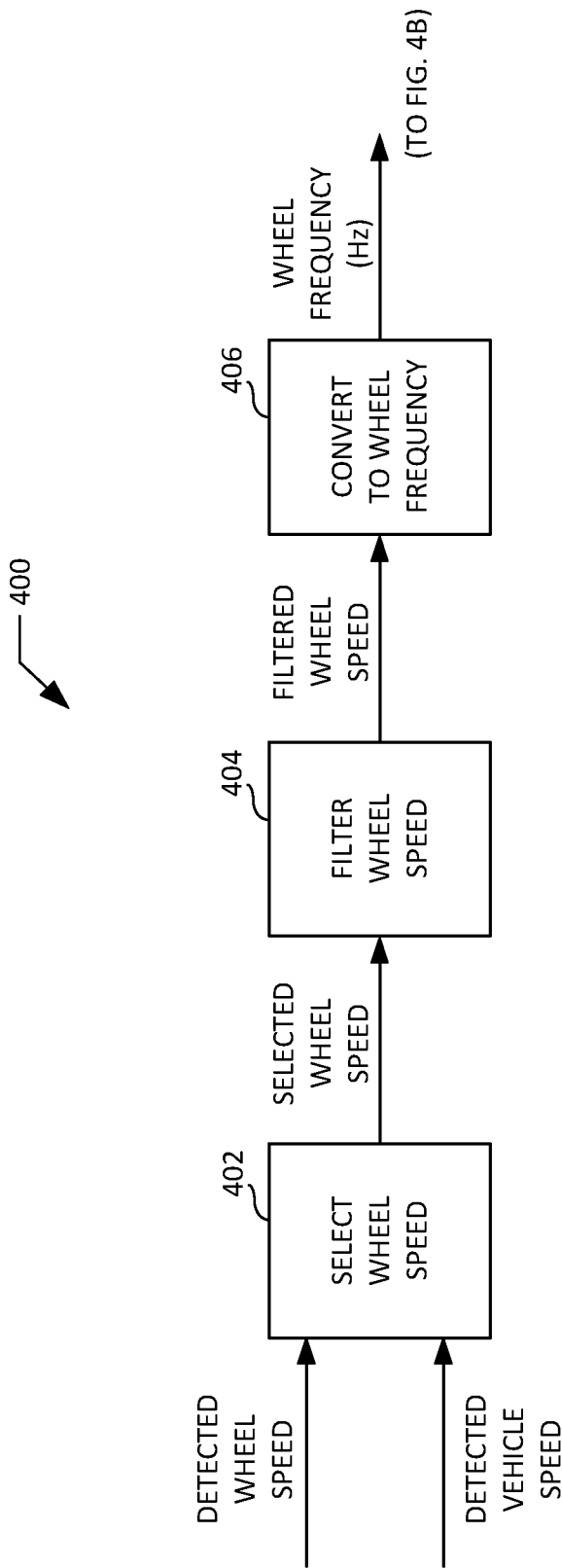
FIGS. 4A and 4B illustrate a first example process diagram to be implemented by the example controller 140 of FIG. 1 in connection with the example nibble control process of FIG. 3.
Figure 4B:
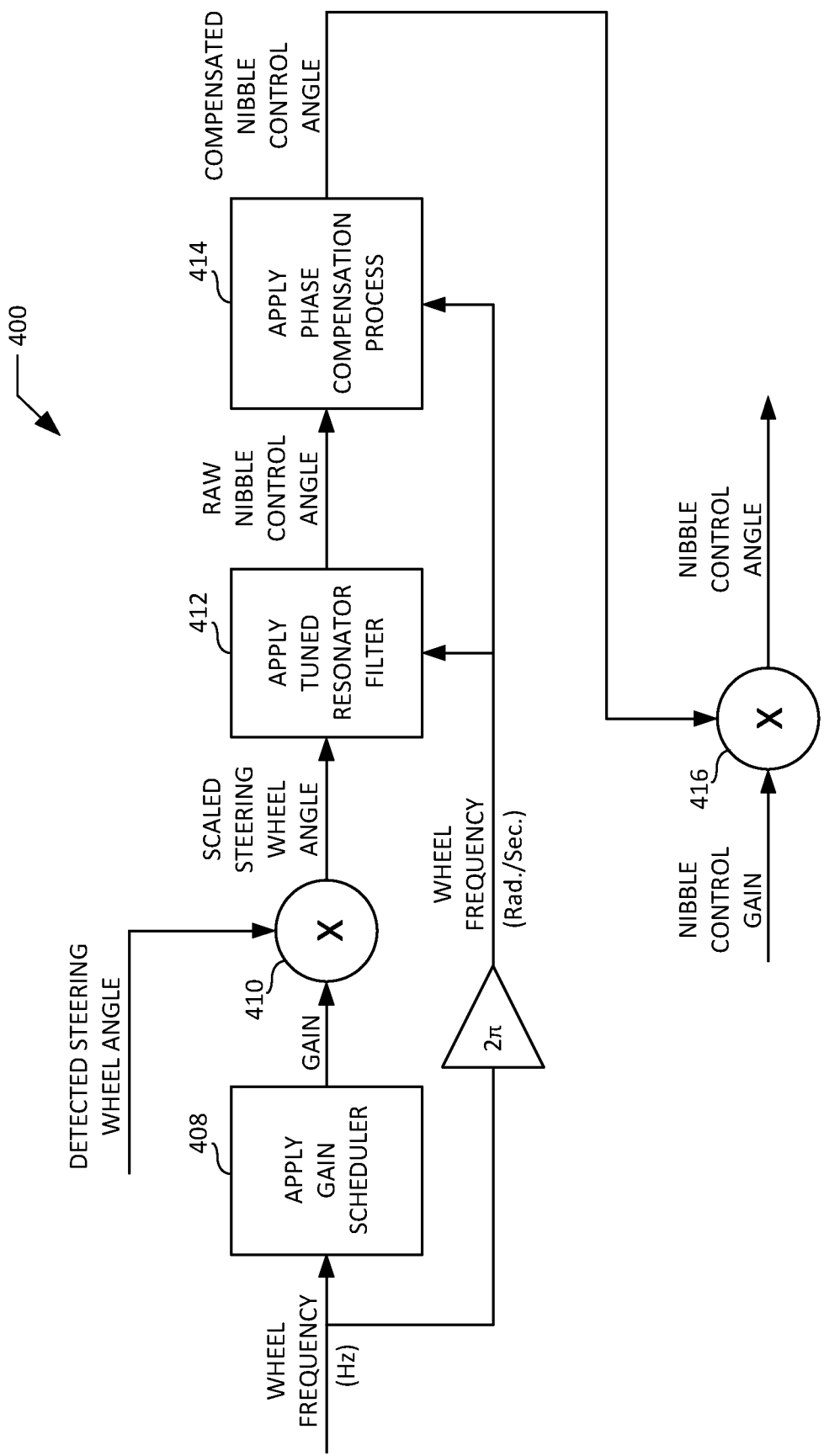

FIGS. 4A and 4B illustrate a first example process diagram 400 to be implemented by the example controller 140 of FIG. 1 in connection with the example nibble control process of FIG. 3. When implementing the illustrated process diagram 400 of FIGS. 4A and 4B, the controller 140 of FIG. 1 selects detected wheel speed data to be filtered and converted (block 402). For example, the controller 140 may select wheel speed data sensed and/or detected from the first wheel 118 of FIG. 1 via the first wheel speed detector 132 of FIG. 1, and/or may select wheel speed data sensed and/or detected from the second wheel 122 of FIG. 1 via the second wheel speed detector 134 of FIG. 1. In some examples, the selected wheel speed data may correspond to the wheel speed data having the most noise associated with steering nibble frequency. In some examples, detected wheel speed data may be unavailable for selection. In such examples, the controller 140 of FIG. 1 may alternatively select the detected vehicle speed data as representative of wheel speed data (e.g., averaged wheel speed data). The controller 140 of FIG. 1 filters the selected wheel speed data to remove high frequency noise (block 404). The controller 140 of FIG. 1 converts the filtered wheel speed data into wheel frequency data using a wheel conversion factor (block 406).

Figure 5:
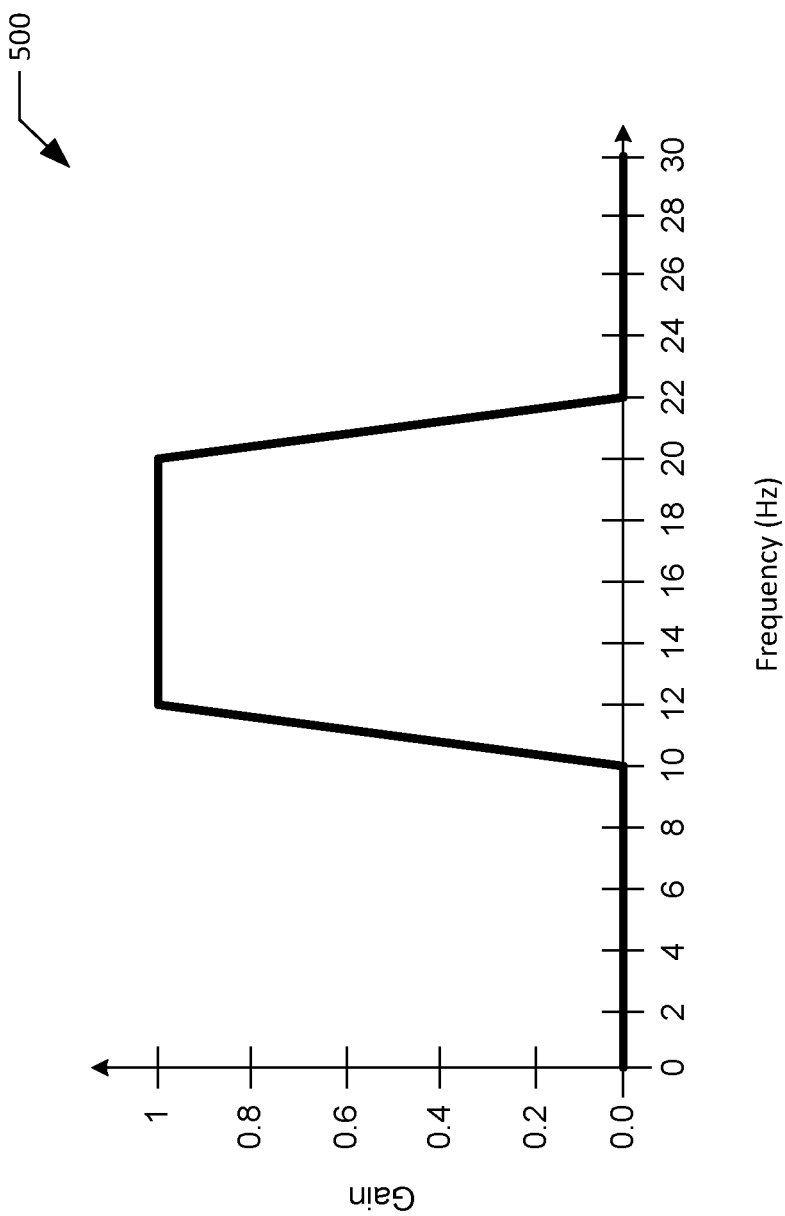
FIG. 5 illustrates an example gain scheduler plot to be implemented by the example controller of FIG. 1 in connection with the example process diagram of FIGS. 4A and 4B.

In the illustrated example of FIGS. 4A and 4B, the controller 140 of FIG. 1 determines a gain (e.g., determined gain data) based on the wheel frequency data. For example, the controller 140 may determine the gain by implementing and/or applying a gain scheduler (e.g., gain scheduler data) that provides gain as a function of wheel frequency (block 408). FIG. 5 illustrates an example gain scheduler plot 500 to be implemented by the example controller 140 of FIG. 1 in connection with the example process diagram 400 of FIGS. 4A and 4B. The gain scheduler plot 500 of FIG. 5 is configured such that the gain to be applied is greatest when the detected wheel frequency data corresponds to a predetermined steering nibble frequency range spanning from approximately 12.0 Hz to approximately 20.0 Hz. The controller 140 of FIG. 1 applies the determined gain data to the detected steering wheel angle data to produce scaled steering wheel angle data (block 410). For example, the controller 140 may multiply the detected steering wheel angle data by the determined gain data to produce scaled steering wheel angle data.

Continuing with the illustrated example of FIGS. 4A and 4B, the controller 140 of FIG. 1 determines raw nibble control angle data based on the scaled steering wheel angle data and further based on the wheel frequency data. For example, the controller 140 may determine raw nibble control angle data and/or a raw nibble control angle signal by applying a tuned resonator filter to the scaled steering wheel angle data, with the tuned resonator filter being tuned and/or dynamically generated based on the wheel frequency data expressed in radians per second (block 412). In some examples, the tuned resonator filter (TRF) may be expressed according to the following function:

$$\mathrm{TRF}(z) = ((N_0 \times z^2) + (N_1 \times z) + (N_2)) / ((D_0 \times z^2) + (D_1 \times z) + (D_2))$$ Equation 1:

where $N_0$, $N_1$, $N_2$, $D_0$, $D_1$, and $D_2$ are filter coefficients, $N_0 = (1-R)$, $N_1 = 0$, $N_2 = (1+R)$, $D_0 = 1$, $D_1 = -2R(\cos(\theta))$, and $D_2 = R^2$, R is a discrete decay factor, $\theta$ is a discrete time resonance frequency expressed in radians and calculated as $\omega_n \times T_s$, $\omega_n$ is a wheel frequency expressed in radians per second, and $T_s$ is a discrete sampling time expressed in seconds.

In the above-described example, the filter coefficients $N_1$ and $D_0$ are fixed, while the filter coefficients $N_0$, $N_2$, $D_1$, and $D_2$ are a function of the discrete decay factor, R. In some examples, the discrete decay factor, R, may approach a value of 1.0 to ensure maximum frequency rejection. The discrete decay factor, R, may be lowered below a value of 1.0 to speed up transient build up as wheel frequency, $\omega_n$, varies. In some examples, a compromise for the discrete decay factor, R, is 0.985. In the event a compromise cannot be reached with satisfactory results, the discrete decay factor, R, adapts with vehicle acceleration. For example, the discrete decay factor, R, can be set close to a value of 1.0 when the vehicle is being driven at near constant speeds, and lowered when the speed of the vehicle is changing. The filter coefficient $D_1$ is the only term that needs to be dynamically adapted for varying wheel frequency, $\omega_n$. This ensures proper selection of the only possible nibble frequency signal for a given wheel frequency, $\omega_n$, with strong rejection of neighboring frequencies.

Figure 6:
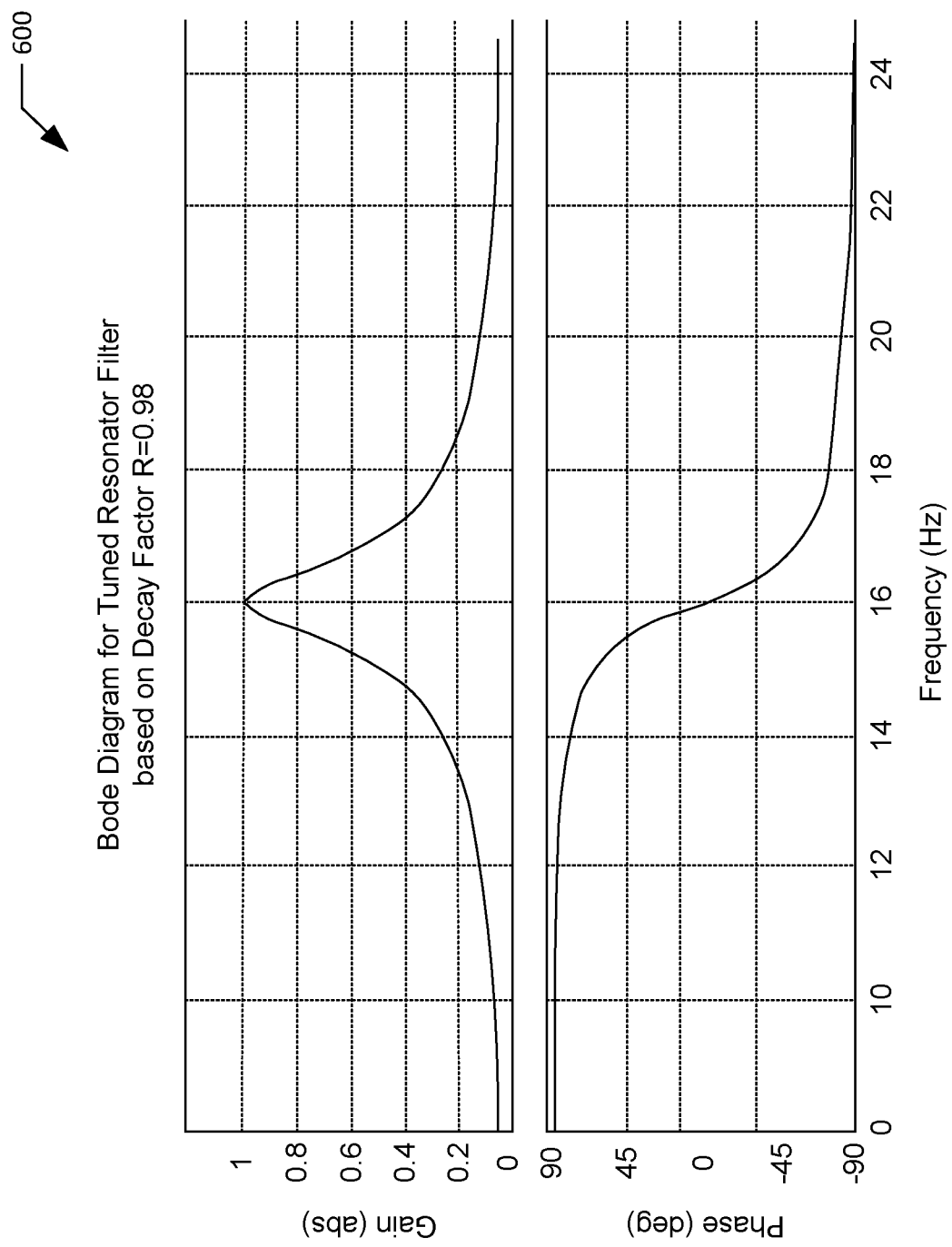
FIG. 6 illustrates an example Bode plot for an example tuned resonator filter to be implemented by the example controller of FIG. 1 in connection with the example process diagram of FIGS. 4A and 4B.

The controller 140 applies the tuned resonator filter to the scaled steering wheel angle data to produce raw nibble control angle data. In some examples, a raw nibble control angle signal (RNCA) corresponding to the raw nibble control angle data may be expressed according to the following function:

$$\mathrm{RNCA}(z) = (\mathrm{TRF}(z)) \times (\mathrm{SSWA}(z))$$ Equation 2:

where SSWA is a scaled steering wheel angle signal corresponding to the scaled steering wheel angle data. In some examples, the raw nibble control angle data and/or signal identifies the instantaneous nibble control angle magnitude, frequency, and phase experienced by at the steering wheel 104 of the vehicle 100 of FIG. 1. The raw nibble control angle data and/or signal has a phase lag equal to zero degrees and gain equal to 1.0 at the wheel frequency, $\omega_n$, and is rapidly attenuated for frequencies away from $\omega_n$. FIG. 6 illustrates an example Bode plot 600 for an example tuned resonator filter to be implemented by the example controller 140 of FIG. 1 in connection with the example process diagram 400 of FIGS. 4A and 4B. In the illustrated example of FIG. 6, the Bode plot 600 for the tuned resonator filter provides gain and phase as a function of wheel frequency for a discrete decay factor, R, of approximately 0.98.

Still continuing with the illustrated example of FIGS. 4A and 4B, the controller 140 of FIG. 1 determines compensated nibble control angle data based on the raw nibble control angle data and further based on the wheel frequency data. For example, the controller 140 may determine compensated nibble control angle data and/or a compensated nibble control angle signal by applying a phase compensation process to the raw nibble control angle data and/or signal, with the phase compensation process being tuned and/or dynamically generated based on the wheel frequency data expressed in radians per second (block 414). The phase compensation process controls (e.g., reduces or eliminates) a delayed phase associated with the inability of the actuator 124 of FIG. 1 to accurately follow and/or track a control signal that is based on the raw nibble control angle data. For example, the presence of inertia at the actuator 124 may limit the ability of the actuator 124 to accurately follow and/or track a control signal that is based on the raw nibble control angle data. Example operational aspects and/or sub-processes of the example phase compensation process of FIGS. 4A and 4B are further described below in connection with FIGS. 7-9.

Figure 7:
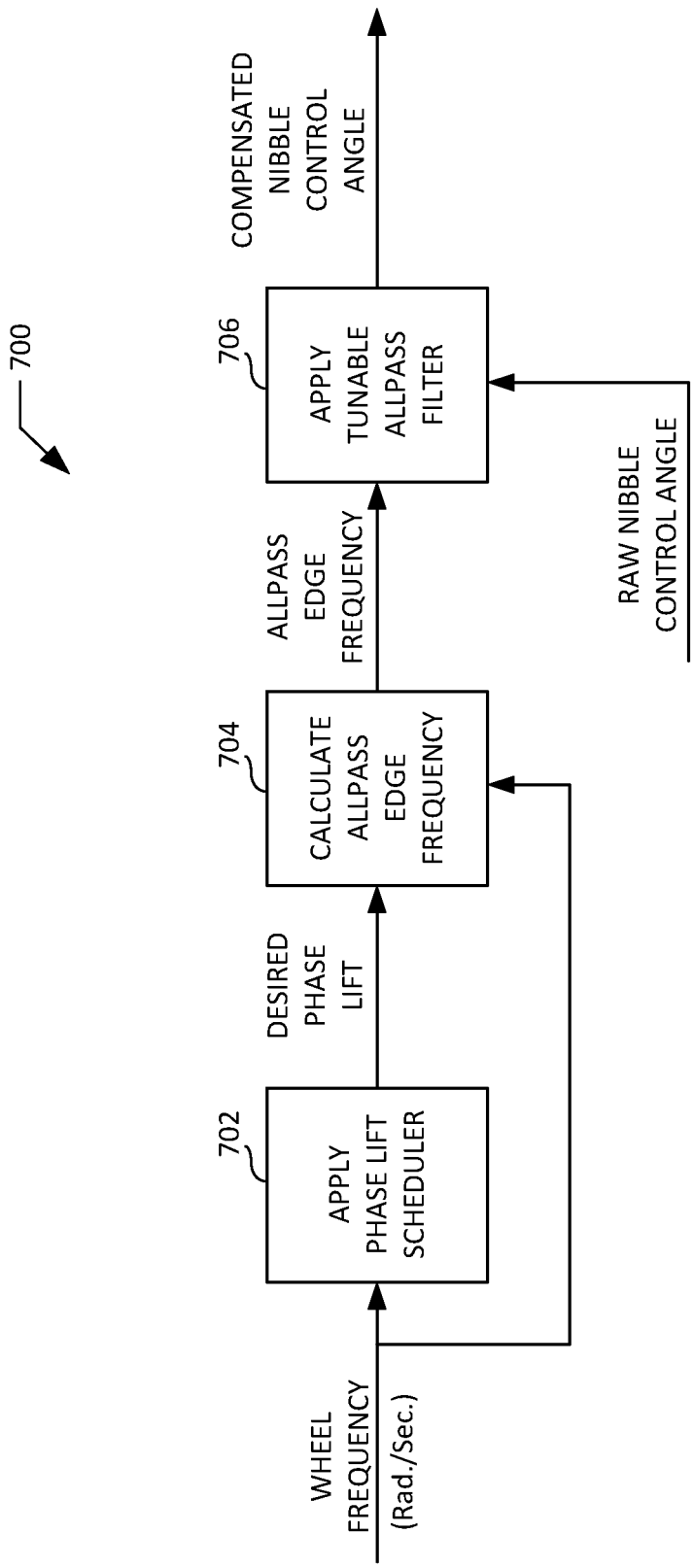
FIG. 7 illustrates an example process diagram to be implemented by the example controller of FIG. 1 in connection with the example phase compensation process of FIGS. 4A and 4B.
Figure 8:
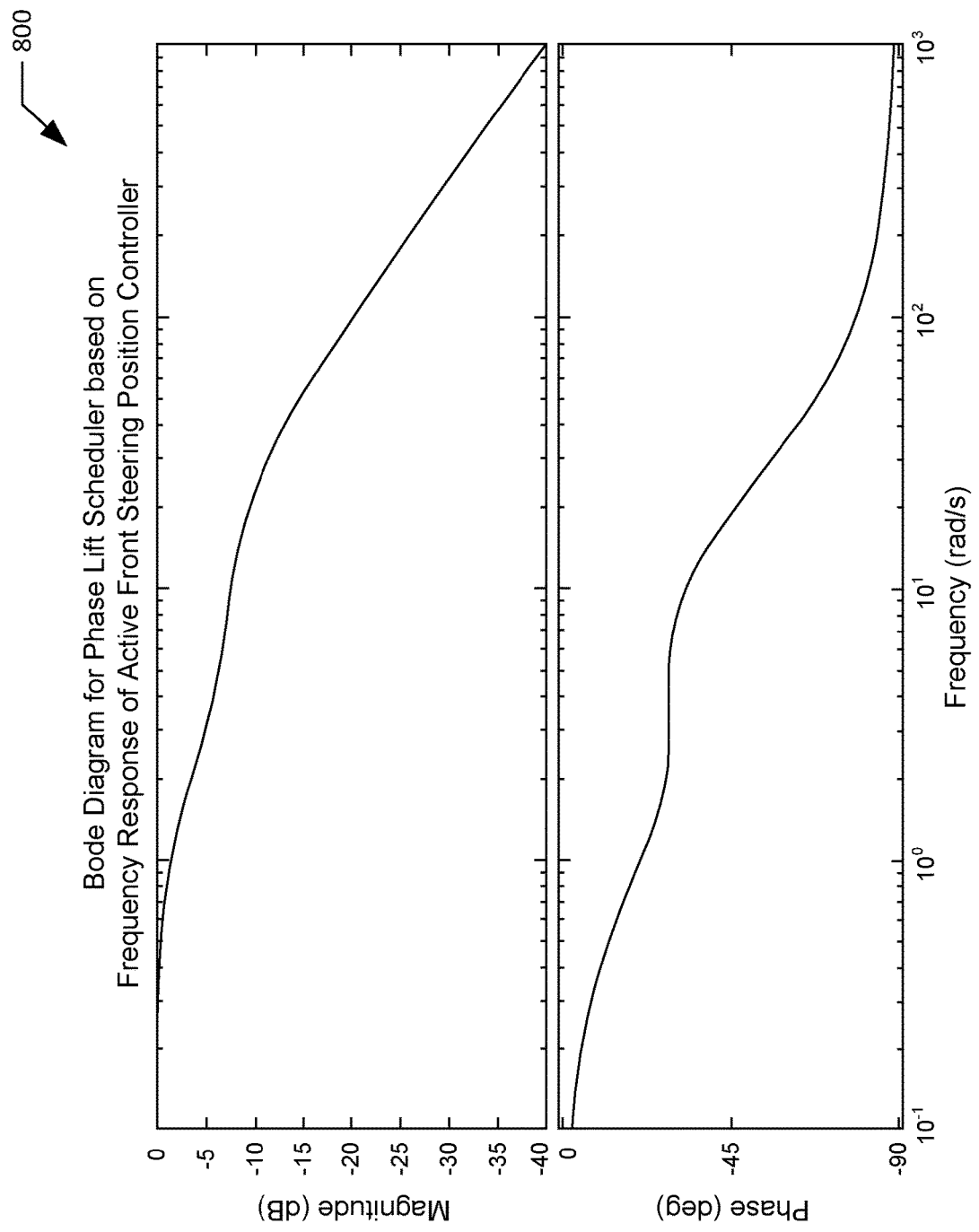
FIG. 8 illustrates an example Bode plot for an example phase lift scheduler to be implemented by the example controller of FIG. 1 in connection with the example process diagram of FIG. 7.

FIG. 7 illustrates an example process diagram 700 to be implemented by the example controller 140 of FIG. 1 in connection with the example phase compensation process of FIGS. 4A and 4B. When implementing the illustrated process diagram 700 of FIG. 7, the controller 140 of FIG. 1 determines a desired phase lift (e.g., desire phase lift data) to be utilized in connection with calculating and/or determining an allpass edge frequency for a tunable allpass filter. For example, the controller 140 may determine the desired phase lift data by implementing and/or applying a phase lift scheduler (e.g., phase lift scheduler data) that provides phase lift as a function of wheel frequency expressed in radians per second (block 702). FIG. 8 illustrates an example Bode plot 800 for an example phase lift scheduler to be implemented by the example controller 140 of FIG. 1 in connection with the example process diagram 700 of FIG. 7. In the illustrated example of FIG. 8, the Bode plot 800 for the phase lift scheduler provides magnitude and phase as a function of wheel frequency expressed in radians per second. The Bode plot 800 of FIG. 8 is representative of the frequency response for an active front steering position controller (e.g., the controller 140 of FIG. 1). As shown in the Bode plot 800 of FIG. 8, the magnitude begins to drop as the frequency begins to rise, meaning that the output of the active front steering position controller is unable to accurately follow and/or track the desired input at higher frequencies. As further shown in FIG. 8, the phase delay begins to increase as the frequency begins to rise. The phase delay of the active front steering position controller corresponds to the desired phase lift data to be determined by the controller 140 of FIG. 1.

Figure 9:
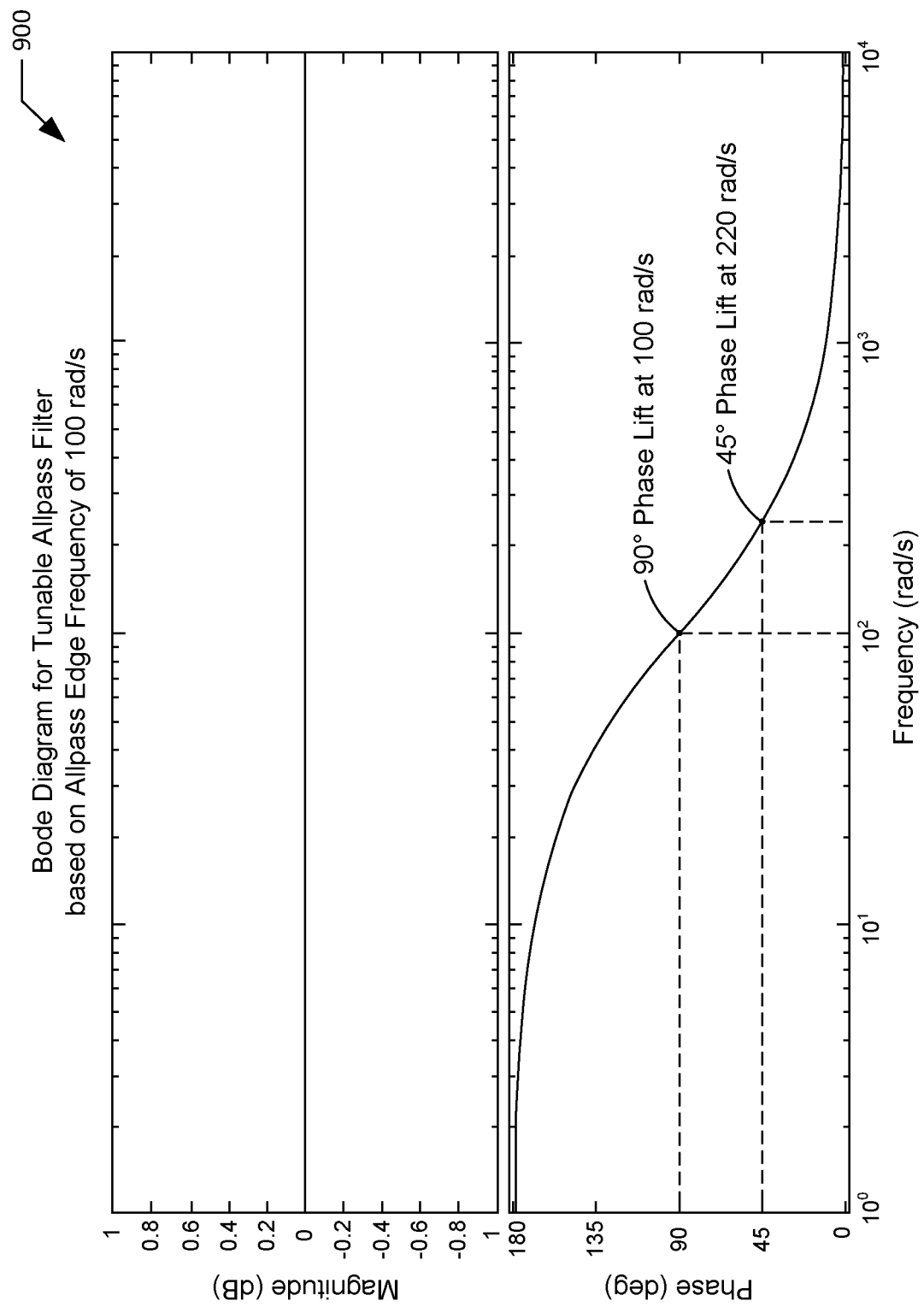
FIG. 9 illustrates an example Bode plot for an example tunable allpass filter to be implemented by the example controller of FIG. 1 in connection with the example process diagram of FIG. 7.

Continuing with the illustrated example of FIG. 7, the controller 140 of FIG. 1 calculates and/or determines an allpass edge frequency (e.g., allpass edge frequency data) for a tunable allpass filter based on the desired phase lift data and further based on the wheel frequency data expressed in radians per second (block 704). In some examples, the allpass edge frequency ($f_{allpass}$) may be expressed according to the following function:

$$f_{allpass} = (\tan((180° - DPL)/2))/f_{wheel} \qquad \text{Equation 3:}$$

where DPL is the desired phase lift, and $f_{wheel}$ is the wheel frequency expressed in radians per second. The controller 140 of FIG. 1 tunes and/or dynamically generates a tunable allpass filter based on the allpass edge frequency data. FIG. 9 illustrates an example Bode plot 900 for an example tunable allpass filter to be implemented by the example controller 140 of FIG. 1 in connection with the example process diagram 700 of FIG. 7. In the illustrated example of FIG. 9, the Bode plot 900 for the tunable allpass filter provides magnitude and phase as a function of frequency expressed in radians per second. As shown in the Bode plot 900 of FIG. 9, the magnitude is constant (e.g., zero decibels) over the entire frequency range. As further shown in FIG. 9, a phase lift approaching one hundred eighty degrees is associated with very low frequencies (e.g., frequencies less than ten radians per second), while a phase lift approaching zero degrees is associated with higher frequencies (e.g., frequencies greater than five thousand radians per second). A phase lift of approximately ninety degrees is associated with a frequency corresponding to the calculated allpass edge frequency which, in the illustrated example of FIG. 9, is approximately one hundred radians per second.

Continuing with the illustrated example of FIG. 7, the controller 140 of FIG. 1 applies the tunable allpass filter to the raw nibble control angle data and/or signal to produce compensated nibble control data and/or a compensated nibble control signal corresponding to the compensated nibble control data described above in connection with the process diagram 400 of FIGS. 4A and 4B (block 706).

Returning to the illustrated example of FIGS. 4A and 4B, the controller 140 of FIG. 1 applies predetermined nibble control gain data to the compensated nibble control angle data to produce nibble control angle data (block 416). For example, the controller 140 may multiply the compensated nibble control angle data by the nibble control gain data to produce nibble control angle data corresponding to the nibble control angle data described above in connection with the process diagram 300 of FIG. 3.

Figure 10A:
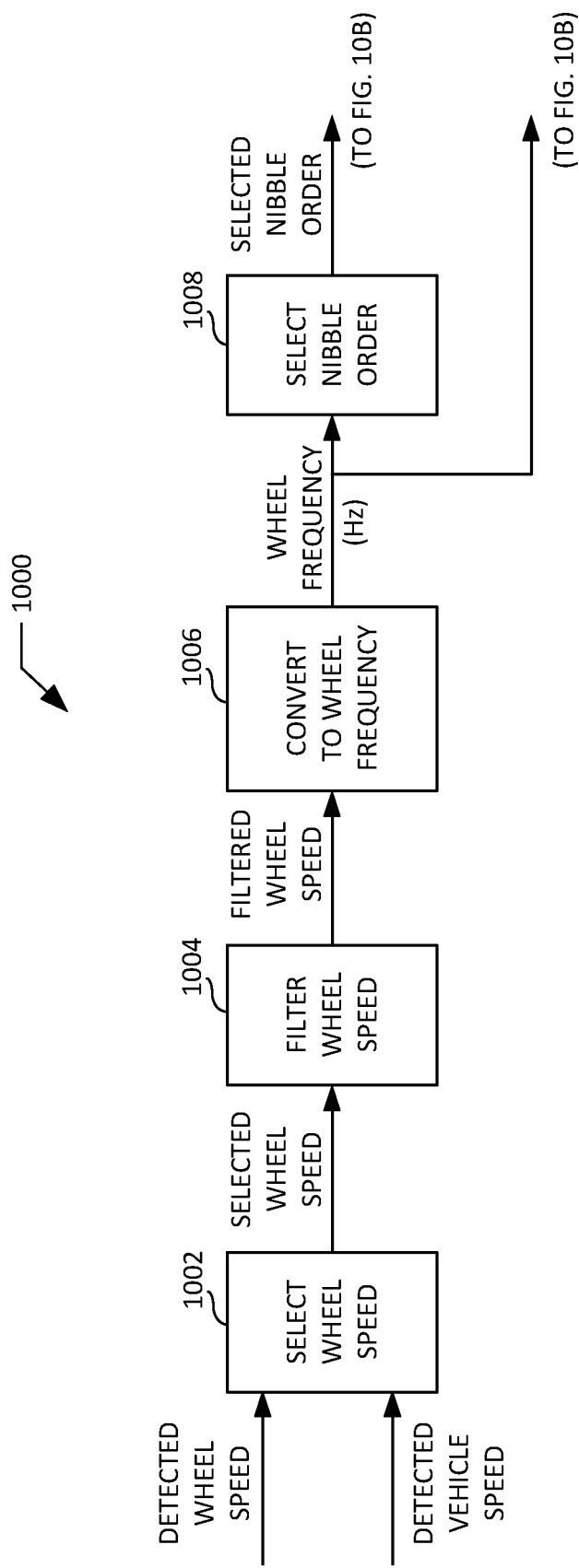
FIGS. 10A, 10B, and 10C illustrate a second example process diagram to be implemented in connection with the example nibble control process of FIG. 3.
Figure 10B:
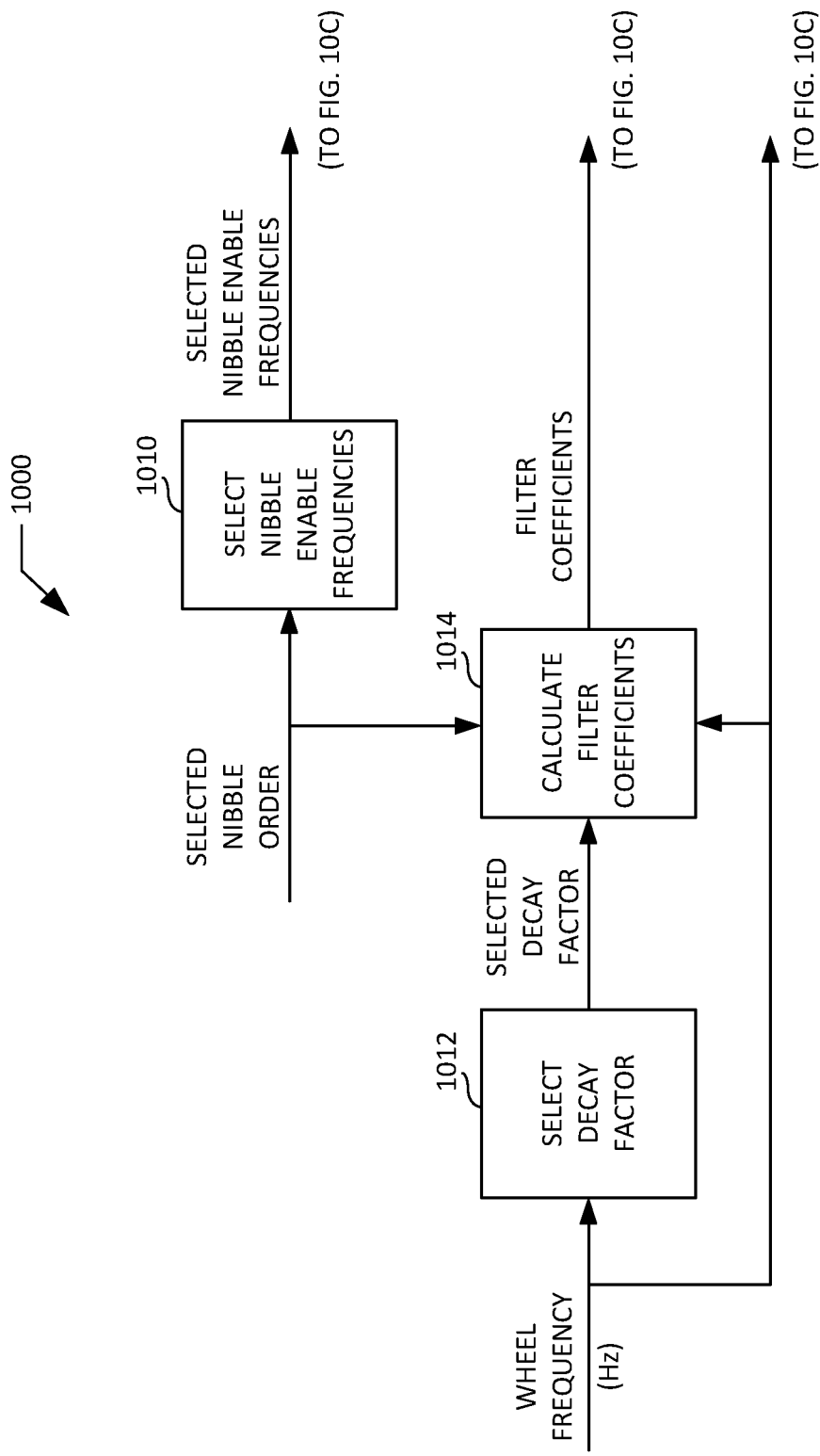
Figure 10C:
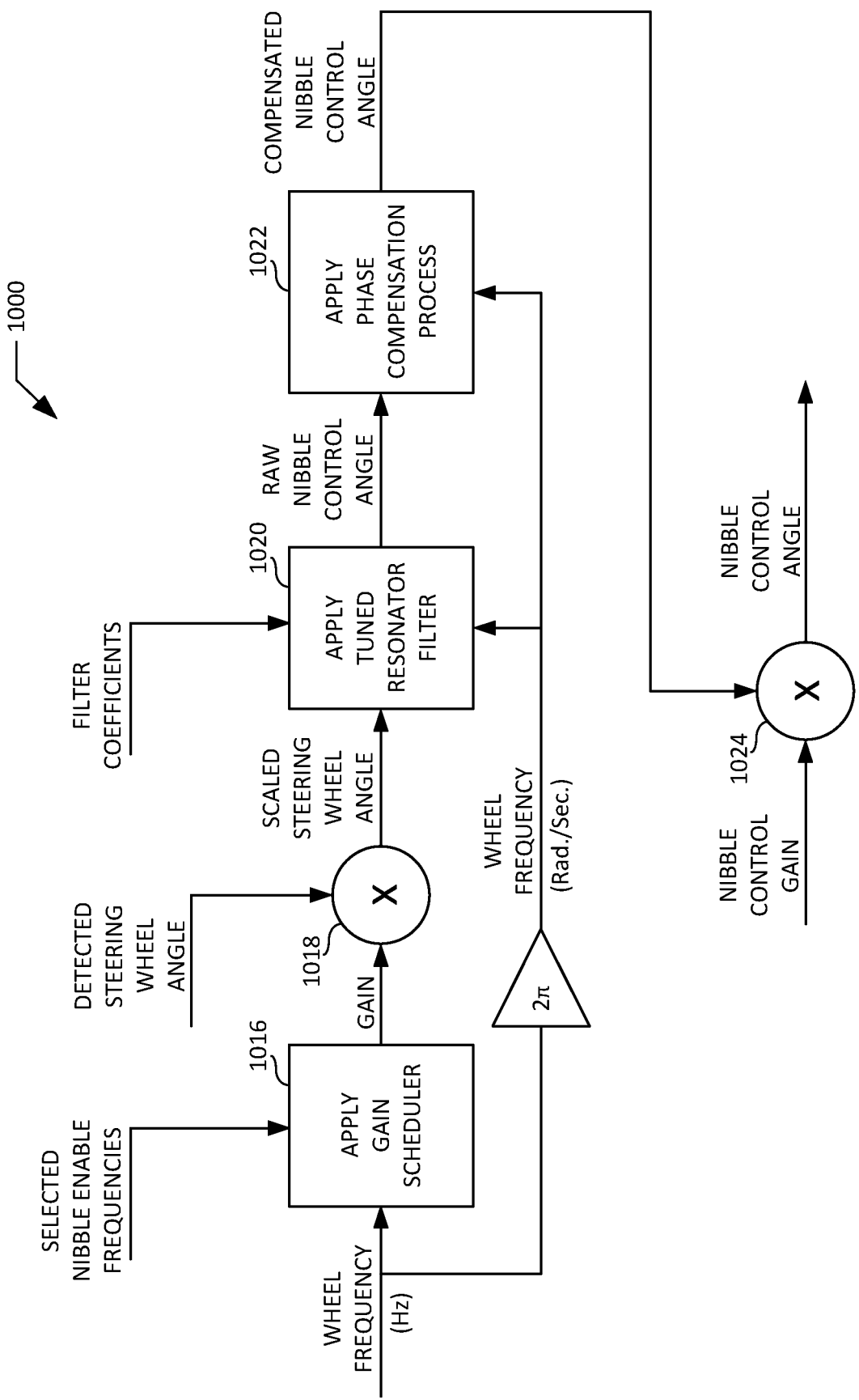

While steering nibble is typically a first order phenomenon occurring at a frequency of one times (1×) the frequency of the front wheel speed, steering nibble may also be present as a second order phenomenon occurring at a frequency of two times (2×) the frequency of the front wheel speed. FIGS. 10A, 10B and 10C illustrate a second example process diagram 1000 to be implemented by the example controller 140 of FIG. 1 in connection with the example nibble control process of FIG. 3. While the first example process diagram 400 of FIGS. 4A and 4B discussed above is directed to first order steering nibble, the second example process diagram 1000 of FIGS. 10A-10C is configurable and/or tunable to first order steering nibble or second order steering nibble.

When implementing the illustrated process diagram 1000 of FIGS. 10A-10C, the controller 140 of FIG. 1 selects detected wheel speed data to be filtered and converted (block 1002). For example, the controller 140 may select wheel speed data sensed and/or detected from the first wheel 118 of FIG. 1 via the first wheel speed detector 132 of FIG. 1, and/or may select wheel speed data sensed and/or detected from the second wheel 122 of FIG. 1 via the second wheel speed detector 134 of FIG. 1. In some examples, the selected wheel speed data may correspond to the wheel speed data having the most noise associated with steering nibble frequency. In some examples, detected wheel speed data may be unavailable for selection. In such examples, the controller 140 of FIG. 1 may alternatively select the detected vehicle speed data as representative of wheel speed data (e.g., averaged wheel speed data).

Continuing with the illustrated example of FIGS. 10A-10C, the controller 140 of FIG. 1 filters the selected wheel speed data to remove high frequency noise (block 1004). The controller 140 of FIG. 1 converts the filtered wheel speed data into wheel frequency data using a wheel conversion factor (block 1006). The controller 140 of FIG. 1 selects the steering nibble order based on the wheel frequency data (block 1008). For example, the controller 140 of FIG. 1 may select first order steering nibble (e.g., 1× the wheel frequency data), second order steering nibble (e.g., 2× the wheel frequency data), or first and second order steering nibble (e.g., 1× and 2× the wheel frequency data).

Still continuing with the illustrated example of FIGS. 10A-10C, the controller 140 of FIG. 1 selects nibble enable frequencies (e.g., nibble enable frequencies data) based on the selected nibble order data (block 1010). For example, may select a first set of nibble enable frequencies in response to the selected nibble order being first order steering nibble, a second set of nibble enable frequencies in response to the selected nibble order being second order steering nibble, and a third set of nibble enable frequencies in response to the selected nibble order being first and second order steering nibble. The controller 140 of FIG. 1 also selects a decay factor (e.g., selected decay factor data) based on the wheel frequency data (block 1012). For example, the controller 140 may select a decay factor having a value approaching 1.0 when the wheel frequency data is constant. The controller 140 may select a relatively lower decay factor when the wheel frequency data is variable. The controller 140 of FIG. 1 also calculates and/or determines filter coefficients (e.g., filter coefficients data) based on the selected nibble order data, the selected decay factor data, and the wheel frequency data (block 1014). For example, the controller 140 of FIG. 1 may calculate and/or determine the filter coefficients associated with Equation 1 described above.

Still continuing with the illustrated example of FIGS. 10A-10C, the controller 140 of FIG. 1 determines a gain (e.g., determined gain data) based on the wheel frequency data and/or based on the selected nibble enable frequencies. For example, the controller 140 may determine the gain by implementing and/or applying a gain scheduler (e.g., gain scheduler data) that provides gain as a function of wheel frequency and/or as a function of the enabled nibble frequencies (block 1016). In some examples, the gain scheduler may correspond to the example gain scheduler plot 500 of FIG. 5 described above. The controller 140 of FIG. 1 applies the determined gain data to the detected steering wheel angle data to produce scaled steering wheel angle data (block 1018). For example, the controller 140 may multiply the detected steering wheel angle data by the determined gain data to produce scaled steering wheel angle data.

Still continuing with the illustrated example of FIGS. 10A-10C, the controller 140 of FIG. 1 determines raw nibble control angle data based on the scaled steering wheel angle data, the wheel frequency data, and the filter coefficients data. For example, the controller 140 may determine raw nibble control angle data and/or a raw nibble control angle signal by applying a tuned resonator filter to the scaled steering wheel angle data, with the tuned resonator filter being tuned and/or dynamically generated based on the wheel frequency data expressed in radians per second and further based on the filter coefficients data (block 1020). In some examples, the tuned resonator filter (TRF) may be expressed as a function corresponding to Equation 1 described above. The controller 140 applies the tuned resonator filter to the scaled steering wheel angle data to produce raw nibble control angle data. In some examples, a raw nibble control angle signal (RNCA) corresponding to the raw nibble control angle data may be expressed as a function corresponding to Equation 2 described above. In some examples, the tuned resonator filter may correspond to the example tuned resonator filter Bode plot 600 of FIG. 6 described above.

Still continuing with the illustrated example of FIGS. 10A-10C, the controller 140 of FIG. 1 determines compensated nibble control angle data based on the raw nibble control angle data and further based on the wheel frequency data. For example, the controller 140 may determine compensated nibble control angle data and/or a compensated nibble control angle signal by applying a phase compensation process to the raw nibble control angle data and/or signal, with the phase compensation process being tuned and/or dynamically generated based on the wheel frequency data expressed in radians per second (block 1022). In some examples, the phase compensation process of FIGS. 10A-10C may correspond to the example phase compensation process described above in connection with FIGS. 4A, 4B, and 7-9.

Still continuing with the illustrated example of FIGS. 10A-10C, the controller 140 of FIG. 1 applies predetermined nibble control gain data to the compensated nibble control angle data to produce nibble control angle data (block 1024). For example, the controller 140 may multiply the compensated nibble control angle data by the nibble control gain data to produce nibble control angle data corresponding to the nibble control angle data described above in connection with the process diagram 300 of FIG. 3.

The memory 142 of FIG. 1 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 142 may be stored in any file and/or data structure format, organization scheme, and/or arrangement.

Data and/or information received by the controller 140 and/or, more generally, by the ECU 138 of FIG. 1 from the steering wheel angle detector 128, the vehicle speed detector 130, the first wheel speed detector 132, the second wheel speed detector 134, and/or the actuator angle detector 136 of FIG. 1 may be stored in the memory 142 of FIG. 1. Data and/or information corresponding to any of the above-described detected steering wheel angle data, detected vehicle speed data, detected wheel speed data associated with the first wheel 118, detected wheel speed data associated with the second wheel 122, detected actuator angle data, desired actuator angle data, nibble control angle data, adjusted desired actuator angle data, desired actuator torque data, selected wheel speed data, filtered wheel speed data, wheel frequency data, gain data, scaled steering wheel angle data, raw nibble control angle data, compensated nibble control angle data, nibble control gain data, desired phase lift data, allpass edge frequency data, selected nibble order data, selected nibble enable frequencies data, selected decay factor data, and/or filter coefficients data may be stored in the memory 142. Data and/or information stored in the memory 142 is accessible to the controller 140, the actuator 124, and/or, more generally, the active front steering system 102 of FIG. 1.

While example manners of implementing the active front steering system 102 are illustrated in FIGS. 1-3, 4A, 4B, 5-9, and 10A-10C, one or more of the elements, processes and/or devices illustrated in FIGS. 1-3, 4A, 4B, 5-9, and 10A-10C may be combined, divided, re-arranged, omitted, eliminated and/or implemented in any other way. Further, the example steering wheel angle detector 128, the example vehicle speed detector 130, the first example wheel speed detector 132, the second example wheel speed detector 134, the example actuator angle detector 136, the example ECU 138, the example controller 140, the example memory 142, and/or, more generally, the example active front steering system 102 of FIG. 1 may be implemented by hardware, software, firmware and/or any combination of hardware, software and/or firmware. Thus, for example, any of the example steering wheel angle detector 128, the example vehicle speed detector 130, the first example wheel speed detector 132, the second example wheel speed detector 134, the example actuator angle detector 136, the example ECU 138, the example controller 140, the example memory 142, and/or, more generally, the example active front steering system 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example steering wheel angle detector 128, the example vehicle speed detector 130, the first example wheel speed detector 132, the second example wheel speed detector 134, the example actuator angle detector 136, the example ECU 138, the example controller 140, the example memory 142, and/or, more generally, the example active front steering system 102 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example active front steering system 102 of FIGS. 1-3, 4A, 4B, 5-9, and 10A-10C may include one or more elements, processes and/or devices in addition to, or instead of, those illustrated in FIGS. 1-3, 4A, 4B, 5-9, and 10A-10C, and/or may include more than one of any or all of the illustrated elements, processes and devices.

Figure 11:
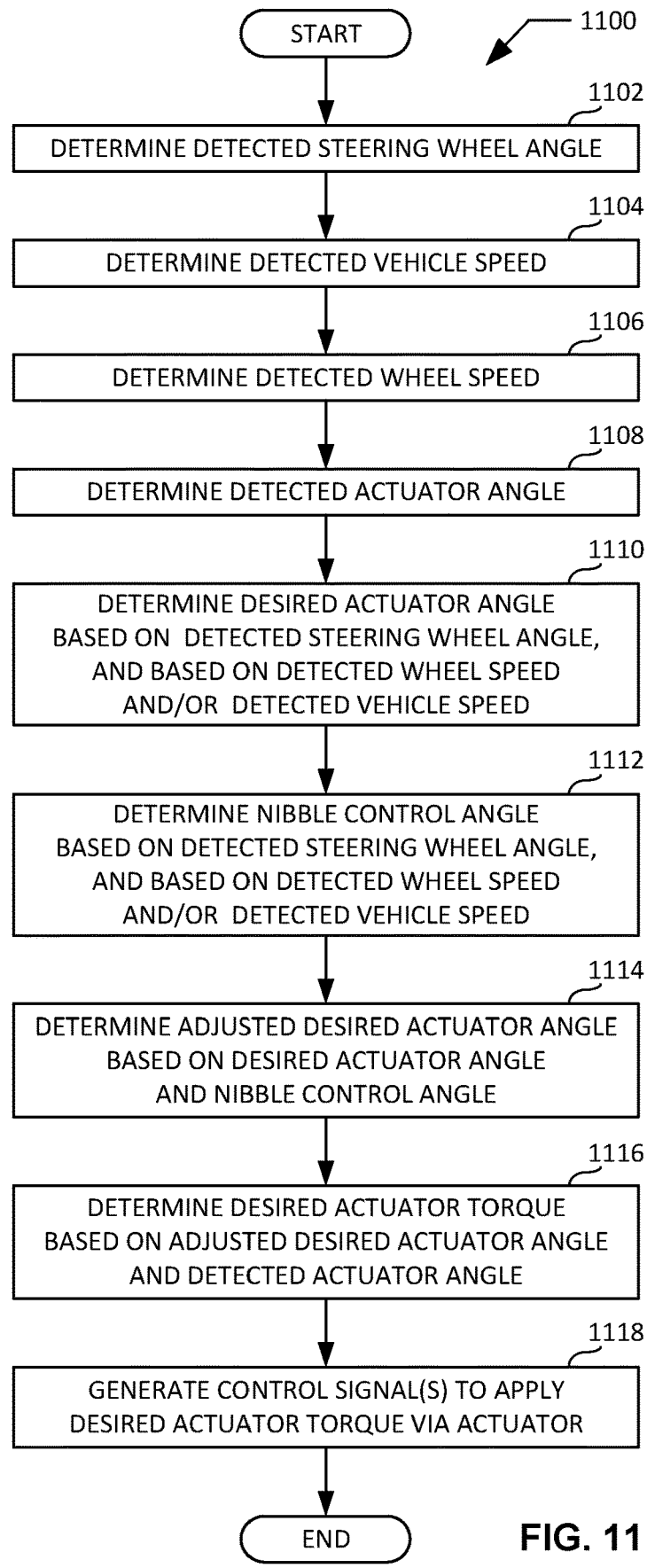
FIG. 11 is a flowchart representative of an example method that may be executed at the example controller of the example active front steering system of FIG. 1 to control steering nibble in the example active front steering system of FIG. 1.

A flowchart representative of an example method for implementing the example controller 140 of the example active front steering system 102 of FIG. 1 to control steering nibble in position controlled steering systems is shown in FIG. 11. In this example, the method may be implemented using machine-readable instructions that comprise one or more program(s) for execution by one or more processor(s) such as the processor 1202 shown in the example processor platform 1200 discussed below in connection with FIG. 12. The one or more program(s) may be embodied in software stored on a non-transitory computer readable storage medium such as a CD-ROM, a floppy disk, a hard drive, a digital versatile disk (DVD), a Blu-ray disk, or a memory associated with the processor 1202, but the entirety of any program and/or parts thereof could alternatively be executed by a device other than the processor 1202, and/or embodied in firmware or dedicated hardware. Further, although the example program(s) is/are described with reference to the flowchart illustrated in FIG. 11, many other methods of implementing the example active front steering system 102 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example method of FIG. 11 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 11 is a flowchart representative of an example method 1100 that may be executed at the example controller 140 of the example active front steering system 102 of FIG. 1 to control steering nibble in the example active front steering system 102 of FIG. 1. The example method 1100 of FIG. 11 begins when the controller 140 of FIG. 1 determines detected steering wheel angle data (block 1102). For example, the controller 140 may determine steering wheel angles of the steering wheel 104 and/or the first steering shaft 106 of FIG. 1 based on the steering wheel angle data sensed and/or detected by the steering wheel angle detector 128 of FIG. 1. Following block 1102, control of the example method 1100 of FIG. 11 proceeds to block 1104.

At block 1104, the controller 140 of FIG. 1 determines detected vehicle speed data (block 1104). For example, the controller 140 may determine vehicle speeds of the vehicle 100 of FIG. 1 based on the vehicle speed data sensed and/or detected by the vehicle speed detector 130 of FIG. 1. Following block 1104, control of the example method 1100 of FIG. 11 proceeds to block 1106.

At block 1106, the controller 140 of FIG. 1 determines detected wheel speed data (block 1106). For example, the controller 140 may determine wheel speeds associated with the first wheel 118 and/or the second wheel 122 of the vehicle 100 of FIG. 1 based on the wheel speed data sensed and/or detected by the first wheel speed detector 132 and/or the second wheel speed detector 134 of FIG. 1. Following block 1106, control of the example method 1100 of FIG. 11 proceeds to block 1108.

At block 1108, the controller 140 of FIG. 1 determines detected actuator angle data (block 1108). For example, the controller 140 may determine actuator angles of the actuator 124 and/or the actuator shaft 126 of FIG. 1 based on the actuator angle data sensed and/or detected by the actuator angle detector 136 of FIG. 1. Following block 1108, control of the example method 1100 of FIG. 11 proceeds to block 1110.

At block 1110, the controller 140 of FIG. 1 determines desired actuator angle data based on the detected steering wheel angle data, and further based on the detected vehicle speed data and/or the detected wheel speed data (block 1110). For example, the controller 140 may determine desired actuator angle data by applying active front steering functions (e.g., variable gear ratios associated with the gear set 108 of the active front steering system 102) to the detected steering wheel angle data and to the detected wheel speed data, as described above in connection with block 302 of the example process diagram 300 of FIG. 3. As another example, the controller 140 may alternatively determine desired actuator angle data by applying active front steering functions to the detected steering wheel angle data and to the detected vehicle speed data, as described above in connection with block 302 of the example process diagram 300 of FIG. 3. Following block 1110, control of the example method 1100 of FIG. 11 proceeds to block 1112.

At block 1112, the controller 140 of FIG. 1 determines nibble control angle data based on the detected steering wheel angle data, and further based on the detected vehicle speed data and/or the detected wheel speed data (block 1110). For example, the controller 140 may determine nibble control angle data by applying the nibble control process described above in connection with any of FIGS. 3, 4A, 4B, 5-9, and/or 10A-10C to the detected steering wheel angle data and to the detected wheel speed data. As another example, the controller 140 may alternatively determine nibble control angle data by applying the nibble control process described above in connection with any of FIGS. 3, 4A, 4B, 5-9, and/or 10A-10C to the detected steering wheel angle data and to the detected vehicle speed data. Following block 1112, control of the example method 1100 of FIG. 11 proceeds to block 1114.

At block 1114, the controller 140 of FIG. 1 determines adjusted desired actuator angle data based on the desired actuator angle data and the nibble control angle data (block 1114). For example, the controller 140 may determine adjusted desired actuator angle data by summing together the desired actuator angle data and the nibble control angle data, as described above in connection with block 306 of the example process diagram 300 of FIG. 3. Following block 1114, control of the example method 1100 of FIG. 11 proceeds to block 1116.

At block 1116, the controller 140 of FIG. 1 determines desired actuator torque data based on the adjusted desired actuator angle data and the detected actuator angle data (block 1116). For example, the controller 140 may determine desired actuator torque data by applying position control functions (e.g., position-to-torque correlation data) to the adjusted desired actuator angle data and to the detected actuator angle data, as described above in connection with block 308 of the example process diagram 300 of FIG. 3. Following block 1116, control of the example method 1100 of FIG. 11 proceeds to block 1118.

At block 1118, the controller 140 of FIG. 1 generates one or more control signal(s) to apply the desired actuator torque data via the actuator 124 of FIG. 1 (block 1118). For example, the controller 140 of FIG. 1 may generate one or more control signal(s) to apply the desired actuator torque data via the actuator 124 of FIG. 1 such that steering nibble which might otherwise be present at the steering wheel 104 of the active front steering system 102 of FIG. 1 is controlled, reduced and/or eliminated. Following block 1118, the example method 1100 of FIG. 11 ends.

Figure 12:
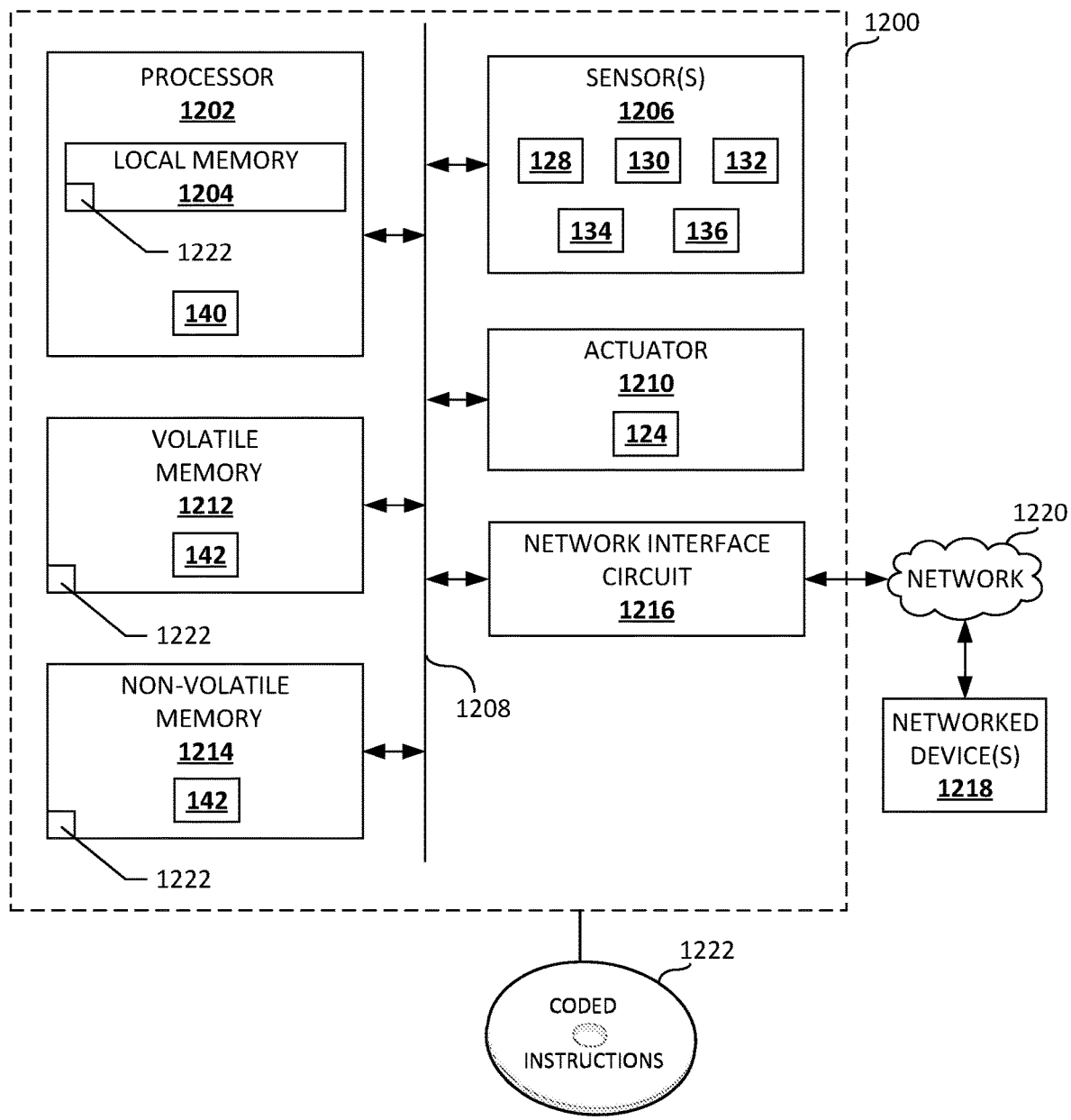
FIG. 12 is a block diagram of an example processor platform capable of executing instructions to implement the example method of FIG. 11, and the example active front steering system of FIG. 1.

FIG. 12 is a block diagram of an example processor platform 1200 capable of executing instructions to implement the example method 1100 of FIG. 11, and the example active front steering system 102 of FIG. 1. The processor platform 1200 of the illustrated example includes a processor 1202. The processor 1202 of the illustrated example is hardware. For example, the processor 1202 can be implemented by one or more integrated circuit(s), logic circuit(s), microprocessor(s) or controller(s) from any desired family or manufacturer. In the example of FIG. 12, the processor 1202 implements the example controller 140 of FIG. 1. The processor 1202 of the illustrated example also includes a local memory 1204 (e.g., a cache).

The processor 1202 of the illustrated example is in communication with one or more sensor(s) 1206 via a bus 1208 (e.g., a CAN bus). In the example of FIG. 12, the sensor(s) 1206 include the example steering wheel angle detector 128, the example vehicle speed detector 130, the first example wheel speed detector 132, the second example wheel speed detector 134, and the actuator angle detector of FIG. 1. The processor 1202 of the illustrated example is also in communication with an actuator 1210 via the bus 1208. In the example of FIG. 12, the actuator 1210 is implemented via the example actuator 124 of FIG. 1.

The processor 1202 of the illustrated example is also in communication with a main memory including a volatile memory 1212 and a non-volatile memory 1214 via the bus 1208. The volatile memory 1212 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1214 may be implemented by flash memory and/or any other desired type of memory device. Access to the volatile memory 1212 and the non-volatile memory 1214 is controlled by a memory controller. In the illustrated example, the main memory 1212, 1214 includes the example memory 142 of FIG. 1.

The processor platform 1200 of the illustrated example also includes a network interface circuit 1216. The network interface circuit 1216 may be implemented by any type of interface standard, such as an Ethernet interface, a universal serial bus (USB), and/or a PCI express interface. The network interface circuit 1216 of the illustrated example includes a communication device such as a transmitter, a receiver, a transceiver, a modem and/or network interface card to facilitate exchange of data with one or more networked device(s) 1218 (e.g., computing devices of any kind) via a network 1220 (e.g., a controller area network, a wireless network, a cellular network, etc.).

Coded instructions 1222 for implementing the example method 1100 of FIG. 11 may be stored in the local memory 1204, in the volatile memory 1212, in the non-volatile memory 1214, and/or on a removable tangible computer readable storage medium such as a CD or DVD.

The methods and apparatus described above in connection the active front steering system 102 of FIG. 1 may be adapted to other types of position controlled steering systems (e.g., steer-by-wire steering systems), as well as to autonomous steering systems. Steer-by-wire steering systems and autonomous steering systems lack a mechanical connection between the steering wheel and the steering rack. The driver of a vehicle incorporating a steer-by-wire steering system or an autonomous steering system will therefore experience steering nibble only in an instance where a feedback actuator coupled to the steering wheel of the vehicle actuates and/or applies a steering nibble torque to the steering wheel. In addition to steering nibble, imbalance in the wheels of the vehicle may also trigger vehicle body nibble (e.g., a shaking and/or vibration of the vehicle body). The nibble control methodologies and/or processes described above in connection with the active front steering system 102 of FIG. 1 may be modified and/or adapted to be implemented in steer-by-wire steering systems and/or autonomous steering systems to control (e.g., reduce and/or eliminate) vehicle body nibble.

Figure 13:
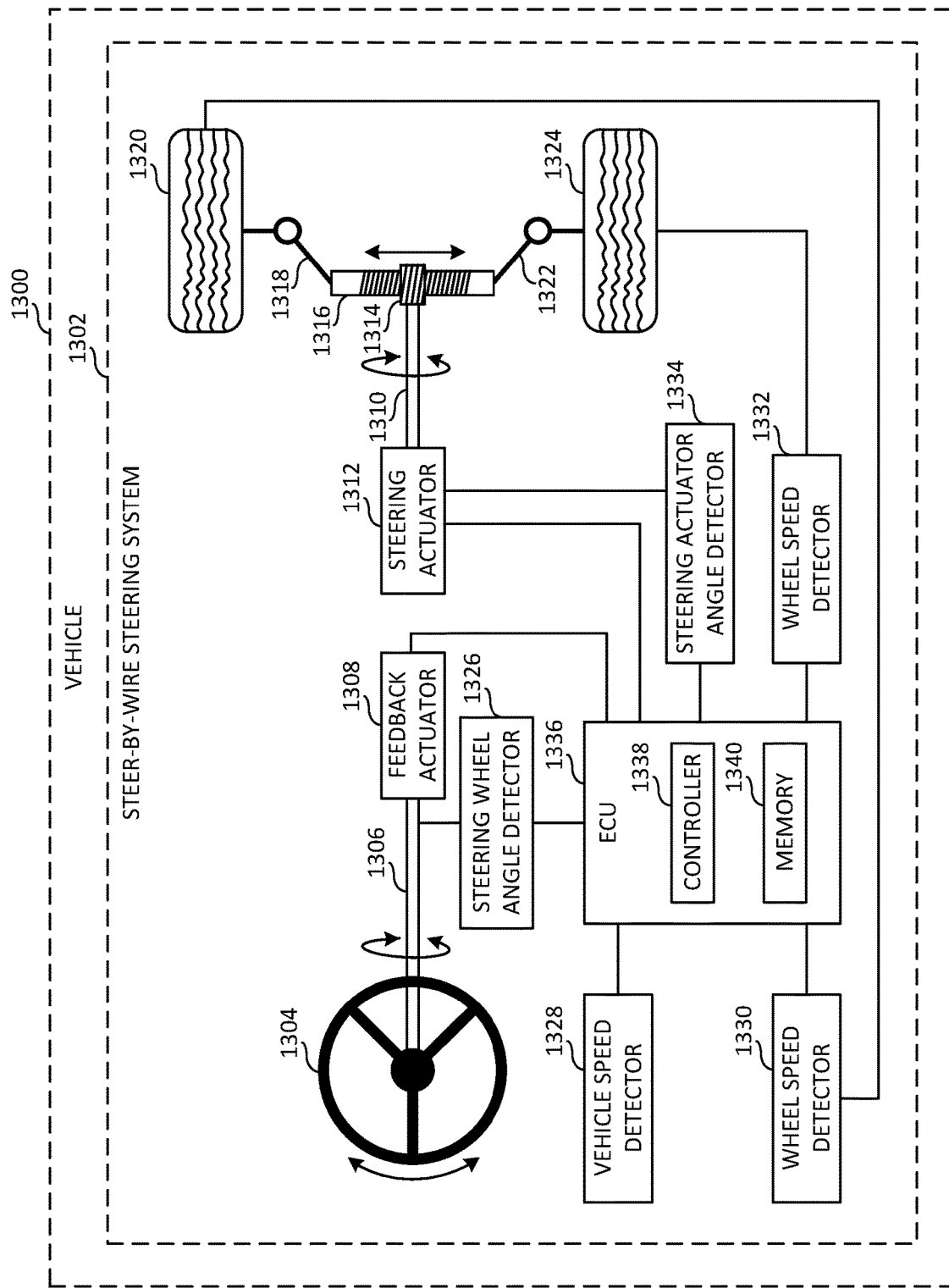
FIG. 13 is a block diagram of an example vehicle including an example steer-by-wire steering system constructed in accordance with the teachings of this disclosure.

For example, FIG. 13 is a block diagram of an example vehicle 1300 including an example steer-by-wire steering system 1302 constructed in accordance with the teachings of this disclosure. The steer-by-wire steering system 1302 of FIG. 13 includes an example steering wheel 1304, a first example steering shaft 1306, an example feedback actuator 1308, a second example steering shaft 1310, an example steering actuator 1312, an example pinion 1314, an example rack 1316, a first example tie rod 1318, a first example wheel 1320, a second example tie rod 1322, a second example wheel 1324, an example steering wheel angle detector 1326, an example vehicle speed detector 1328, a first example wheel speed detector 1330, a second example wheel speed detector 1332, an example steering angle detector 1334, and an example electronic control unit (ECU) 1336 including an example controller 1338 and an example memory 1340. Respective ones of the feedback actuator 1308, the steering actuator 1312, the steering wheel angle detector 1326, the vehicle speed detector 1328, the first wheel speed detector 1330, the second wheel speed detector 1332, and the steering actuator angle detector 1334 of the steer-by-wire steering system 1302 of FIG. 13 are operatively coupled to the controller 1338, the memory 1340, and/or, more generally, the ECU 1336 of the steer-by-wire steering system 1302 of FIG. 13 via a network such as a CAN.

The steering wheel 1304 of FIG. 13 receives steering inputs from a driver of the vehicle 1300 of FIG. 13. The first steering shaft 1306 of FIG. 13 is coupled to the steering wheel 1304 and to the feedback actuator 1308 of FIG. 13. For example, a first end of the first steering shaft 1306 may be coupled to the steering wheel 1304 such that the first steering shaft 1306 rotates in response to rotation of the steering wheel 1304, and vice-versa. A second end of the first steering shaft 1306 located opposite the first end of the first steering shaft 1306 may be coupled to the feedback actuator 1308 of FIG. 13. In some examples, the feedback actuator 1308 of FIG. 13 may be implemented by an electric motor. The feedback actuator 1308 of FIG. 13 may apply, convey and/or transfer a torque to the first steering shaft 1306 of FIG. 13 to control the ease by which the steering wheel 1304 of FIG. 13 may be rotated. The feedback actuator 1308 of FIG. 13 is controlled via one or more control signal(s) generated by the controller 1338 of the ECU 1336 of FIG. 13. In some examples, the torque to be applied, conveyed and/or transferred via the feedback actuator 1308 to the first steering shaft 1306 may be based on the torque to be applied, conveyed and/or transferred via the steering actuator 1312 to the second steering shaft 1310 of FIG. 13.

The second steering shaft 1310 of FIG. 1 is coupled to the steering actuator 1312 and to the pinion 1314 of FIG. 13. For example, a first end of the second steering shaft 1310 located opposite the pinion 1314 may be coupled to the steering actuator 1312. In some examples, the steering actuator 1312 of FIG. 13 may be implemented by an electric motor. The steering actuator 1312 of FIG. 13 applies, conveys and/or transfers a torque to the second steering shaft 1310 of FIG. 13 to cause the second steering shaft 1310 to rotate. The steering actuator 1312 of FIG. 13 is controlled via one or more control signal(s) generated by the controller 1338 of the ECU 1336 of FIG. 13. A second end of the second steering shaft 1310 located opposite the first end of the second steering shaft 1310 may be coupled to the pinion 1314 such that the pinion 1314 rotates in response to rotation of the second steering shaft 1310, and vice-versa. In some examples, the pinion 1314 may be integrally formed with the second steering shaft 1310.

The pinion 1314 of FIG. 13 engages and/or interfaces with the rack 1316 of FIG. 13 such that the rack 1316 translates in response to rotation of the pinion 1314. The first wheel 1320 of FIG. 13 is coupled to a first end of the rack 1316 via the first tie rod 1318 of FIG. 13, and the second wheel 1324 of FIG. 13 is coupled to a second end of the rack 1316 opposite the first end of the rack 1316 via the second tie rod 1322 of FIG. 13. Translational movement of the rack 1316 of FIG. 13 causes the first wheel 1320 and the second wheel 1324 of FIG. 13 to be respectively steered via corresponding ones of the first tie rod 1318 and the second tie rod 1322 to adjust a direction of travel of the vehicle 1300 of FIG. 13 (e.g., to turn the vehicle 1300).

In the illustrated example of FIG. 13, respective ones of the steering wheel angle detector 1326, the vehicle speed detector 1328, the first wheel speed detector 1330, the second wheel speed detector 1332, the steering actuator angle detector 1334, and the memory 1340 of the steer-by-wire steering system 1302 of FIG. 13 may operate, function, and/or be implemented in a manner that is substantially the same as that described above in connection with corresponding respective ones of the steering wheel angle detector 128, the vehicle speed detector 130, the first wheel speed detector 132, the second wheel speed detector 134, the actuator angle detector 136, and the memory 142 of the active front steering system 102 of FIG. 1. However, unlike the active front steering system 102 of FIG. 1, which includes a mechanical connection between the steering wheel 104 and the rack 114, the steer-by-wire steering system 1302 of FIG. 13 lacks a mechanical connection between the steering wheel 1304 and the rack 1316. The lack of a mechanical connection between the steering wheel 1304 and the rack 1316 of FIG. 13 generally prevents vehicle nibble occurring at the rack 1316 of FIG. 13 from being transferred to the steering wheel 1304 of FIG. 13. It follows that such vehicle nibble may be controlled (e.g., reduced and/or eliminated) in response to the vehicle nibble being sensed and/or detected at the steering actuator angle detector 1334 of FIG. 13, as opposed to being sensed and/or detected at the steering wheel angle detector 1326 of FIG. 13.

In the illustrated example of FIG. 13, vehicle nibble may be transferred, conveyed and/or transmitted from the first wheel 1320 and/or the second wheel 1324 of FIG. 13 to the steering actuator 1312 and/or the body of the vehicle 1300 of FIG. 13 via the first tie rod 1318, the second tie rod 1322, the rack 1316, the pinion 1314, and the second steering shaft 1310 of FIG. 13. The controller 1338 of FIG. 13 may execute and/or otherwise implement a nibble control process to control (e.g. reduce and/or eliminate) vehicle nibble that would otherwise be transferred, conveyed and/or transmitted to the steering actuator 1312 and/or the body of the vehicle 1300 of FIG. 13. For example, the controller 1338 of FIG. 13 may execute and/or otherwise implement the above-described method 1100 of FIG. 11 and/or any of the nibble control processes described above in connection with FIGS. 3, 4A, 4B, 5-9, and 10A-10C to control vehicle nibble in the steer-by-wire steering system 1302 of FIG. 13. Such methodologies and/or processes may be modified and/or adapted such that the vehicle nibble to be controlled (e.g., reduced and/or eliminated) is sensed and/or detected at the steering actuator angle detector 1334 of FIG. 13, as opposed to being sensed and/or detected at the steering wheel angle detector 1326 of FIG. 13.

From the foregoing, it will be appreciated that the disclosed methods and apparatus advantageously control (e.g., reduce and/or eliminate) steering nibble in position controlled steering systems without the need for detecting and/or measuring torque occurring within a steering wheel column and/or a steering wheel shaft of the position controlled steering system of the vehicle.

In some examples, an apparatus is disclosed. In some disclosed examples, the apparatus comprises a controller. In some disclosed examples, the controller is to determine actuator angle data based on steering wheel angle data associated with a steering wheel. In some disclosed examples, the controller is also to determine nibble control angle data based on the steering wheel angle data. In some disclosed examples, the controller is also to determine adjusted actuator angle data based on the actuator angle data and the nibble control angle data. In some disclosed examples, the controller is also to generate a control signal based on the adjusted actuator angle data to apply a torque via an actuator of a position controlled steering system.

In some disclosed examples of the apparatus, the controller is to determine the nibble control angle data by implementing a nibble control process to reduce steering nibble associated with the position controlled steering system.

In some disclosed examples of the apparatus, the controller, in connection with the nibble control process, is to determine wheel frequency data based on detected wheel speed data or detected vehicle speed data associated with the position controlled steering system.

In some disclosed examples of the apparatus, the controller, in connection with the nibble control process, is to determine gain data by applying a gain scheduler to the wheel frequency data. In some disclosed examples, the controller is also to apply the gain data to the steering wheel angle data to produce scaled steering wheel angle data.

In some disclosed examples of the apparatus, the controller, in connection with the nibble control process, is to generate a tuned resonator filter based on the wheel frequency data. In some disclosed examples, the controller is also to apply the tuned resonator filter to the scaled steering wheel angle data to produce raw nibble control angle data.

In some disclosed examples of the apparatus, the controller, in connection with the nibble control process, is to apply a phase lift scheduler to the wheel frequency data to determine phase lift data. In some disclosed examples, the controller is also to determine allpass edge frequency data based on the phase lift data and the wheel frequency data. In some disclosed examples, the controller is also to generate a tuned allpass filter based on the allpass edge frequency data. In some disclosed examples, the controller is also to apply the tuned allpass filter to the raw nibble control angle data to produce compensated nibble control angle data. In some disclosed examples, the controller is also to apply nibble control gain data to the compensated nibble control angle data to produce the nibble control angle data.

In some disclosed examples of the apparatus, the actuator angle data is further based on detected wheel speed data or detected vehicle speed data associated with the position controlled steering system.

In some disclosed examples of the apparatus, the control signal is further based on detected actuator angle data associated with the actuator.

In some disclosed examples of the apparatus, the position controlled steering system is an active front steering system.

In some disclosed examples of the apparatus, the position controlled steering system is a steer-by-wire steering system.

In some examples, a method is disclosed. In some disclosed examples, the method comprises determining, by executing one or more instructions via a controller, actuator angle data based on steering wheel angle data associated with a steering wheel. In some disclosed examples, the method further comprises determining, by executing one or more instructions via the controller, nibble control angle data based on the steering wheel angle data. In some disclosed examples, the method further comprises determining, by executing one or more instructions via the controller, adjusted actuator angle data based on the actuator angle data and the nibble control angle data. In some disclosed examples, the method further comprises generating, by executing one or more instructions via the controller, a control signal based on the adjusted actuator angle data to apply a torque via an actuator of a position controlled steering system.

In some disclosed examples of the method, determining the nibble control angle data includes implementing, by executing on or more instructions via the controller, a nibble control process to reduce steering nibble associated with the position controlled steering system.

In some disclosed examples, the method further comprises, in connection with the nibble control process, determining wheel frequency data based on detected wheel speed data or detected vehicle speed data associated with the position controlled steering system. In some disclosed examples, the method further comprises determining gain data by applying a gain scheduler to the wheel frequency data. In some disclosed examples, the method further comprises applying the gain data to the steering wheel angle data to produce scaled steering wheel angle data.

In some disclosed examples, the method further comprises, in connection with the nibble control process, generating a tuned resonator filter based on the wheel frequency data. In some disclosed examples, the method further comprises applying the tuned resonator filter to the scaled steering wheel angle data to produce raw nibble control angle data.

In some disclosed examples, the method further comprises, in connection with the nibble control process, applying a phase lift scheduler to the wheel frequency data to determine phase lift data. In some disclosed examples, the method further comprises determining allpass edge frequency data based on the phase lift data and the wheel frequency data. In some disclosed examples, the method further comprises generating a tuned allpass filter based on the allpass edge frequency data. In some disclosed examples, the method further comprises applying the tuned allpass filter to the raw nibble control angle data to produce compensated nibble control angle data. In some disclosed examples, the method further comprises applying nibble control gain data to the compensated nibble control angle data to produce the nibble control angle data.

In some disclosed examples of the method, the actuator angle data is further based on detected wheel speed data or detected vehicle speed data associated with the position controlled steering system.

In some disclosed examples of the method, the control signal is further based on detected actuator angle data associated with the actuator.

In some disclosed examples of the method, the position controlled steering system is an active front steering system.

In some disclosed examples of the method, the position controlled steering system is a steer-by-wire steering system.

In some examples, a non-transitory machine-readable storage medium comprising instructions is disclosed. In some disclosed examples, the instructions, when executed, cause a controller to determine actuator angle data based on steering wheel angle data associated with a steering wheel. In some disclosed examples, the instructions, when executed, cause the controller to determine nibble control angle data based on the steering wheel angle data. In some disclosed examples, the instructions, when executed, cause the controller to determine adjusted actuator angle data based on the actuator angle data and the nibble control angle data. In some disclosed examples, the instructions, when executed, cause the controller to generate a control signal based on the adjusted actuator angle data to apply a torque via an actuator of a position controlled steering system.

In some disclosed examples of the non-transitory machine-readable storage medium, the instructions, when executed, cause the controller to determine the nibble control angle data by implementing a nibble control process to reduce steering nibble associated with the position controlled steering system.

In some disclosed examples of the non-transitory machine-readable storage medium, the instructions, when executed, further cause the controller, in connection with the nibble control process, to determine wheel frequency data based on detected wheel speed data or detected vehicle speed data associated with the position controlled steering system. In some disclosed example, the instructions, when executed, further cause the controller to determine gain data by applying a gain scheduler to the wheel frequency data. In some disclosed example, the instructions, when executed, further cause the controller to apply the gain data to the steering wheel angle data to produce scaled steering wheel angle data.

In some disclosed examples of the non-transitory machine-readable storage medium, the instructions, when executed, further cause the controller, in connection with the nibble control process, to generate a tuned resonator filter based on the wheel frequency data. In some disclosed example, the instructions, when executed, further cause the controller to apply the tuned resonator filter to the scaled steering wheel angle data to produce raw nibble control angle data.

In some disclosed examples of the non-transitory machine-readable storage medium, the instructions, when executed, further cause the controller, in connection with the nibble control process, to apply a phase lift scheduler to the wheel frequency data to determine phase lift data. In some disclosed example, the instructions, when executed, further cause the controller to determine allpass edge frequency data based on the phase lift data and the wheel frequency data. In some disclosed example, the instructions, when executed, further cause the controller to generate a tuned allpass filter based on the allpass edge frequency data. In some disclosed example, the instructions, when executed, further cause the controller to apply the tuned allpass filter to the raw nibble control angle data to produce compensated nibble control angle data. In some disclosed example, the instructions, when executed, further cause the controller to apply nibble control gain data to the compensated nibble control angle data to produce the nibble control angle data.

In some disclosed examples of the non-transitory machine-readable storage medium, the actuator angle data is further based on detected wheel speed data or detected vehicle speed data associated with the position controlled steering system.

In some disclosed examples of the non-transitory machine-readable storage medium, the control signal is further based on detected actuator angle data associated with the actuator.

In some disclosed examples of the non-transitory machine-readable storage medium, the position controlled steering system is an active front steering system.

In some disclosed examples of the non-transitory machine-readable storage medium, the position controlled steering system is a steer-by-wire steering system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a controller to:
   determine actuator angle data based on steering wheel angle data associated with a steering wheel of a position controlled steering system;
   determine nibble control angle data by implementing a nibble control process, wherein the controller, in connection with the nibble control process, is to:
   determine wheel frequency data based on detected wheel speed data or detected vehicle speed data associated with the position controlled steering system;
   determine gain data by applying a gain scheduler to the wheel frequency data; and
   apply the gain data to the steering wheel angle data to produce scaled steering wheel angle data, wherein the nibble control angle data is based on the scaled steering wheel angle data;
   determine adjusted actuator angle data based on the actuator angle data and the nibble control angle data; and
   generate a control signal based on the adjusted actuator angle data to apply a torque via an actuator of the position controlled steering system.

2. The apparatus of claim 1, wherein the nibble control process is to reduce steering nibble associated with the position controlled steering system.

3. The apparatus of claim 1, wherein the controller, in connection with the nibble control process, is to:
   generate a tuned resonator filter based on the wheel frequency data; and
   apply the tuned resonator filter to the scaled steering wheel angle data to produce raw nibble control angle data.

4. The apparatus of claim 3, wherein the controller, in connection with the nibble control process, is to:
   apply a phase lift scheduler to the wheel frequency data to determine phase lift data;

determine allpass edge frequency data based on the phase lift data and the wheel frequency data;
generate a tuned allpass filter based on the allpass edge frequency data;
apply the tuned allpass filter to the raw nibble control angle data to produce compensated nibble control angle data; and
apply nibble control gain data to the compensated nibble control angle data to produce the nibble control angle data.

5. The apparatus of claim 1, wherein the actuator angle data is further based on detected wheel speed data or detected vehicle speed data associated with the position controlled steering system.

6. The apparatus of claim 1, wherein the control signal is further based on detected actuator angle data associated with the actuator.

7. The apparatus of claim 1, wherein the position controlled steering system is an active front steering system.

8. The apparatus of claim 1, wherein the position controlled steering system is a steer-by-wire steering system.

9. A method comprising:
determining, by executing one or more instructions via a controller, actuator angle data based on steering wheel angle data associated with a steering wheel of a position controlled steering system;
determining nibble control angle data by executing one or more instructions via the controller in connection with implementing a nibble control process, wherein implementing the nibble control process includes;
determining wheel frequency data based on detected wheel speed data or detected vehicle speed data associated with the position controlled steering system;
determining gain data by applying a gain scheduler to the wheel frequency data; and
applying the gain data to the steering wheel angle data to produce scaled steering wheel angle data, wherein the nibble control angle data is based on the scaled steering wheel angle data;
determining, by executing one or more instructions via the controller, adjusted actuator angle data based on the actuator angle data and the nibble control angle data; and
generating, by executing one or more instructions via the controller, a control signal based on the adjusted actuator angle data to apply a torque via an actuator of the position controlled steering system.

10. The method of claim 9, wherein implementing the nibble control process reduces steering nibble associated with the position controlled steering system.

11. The method of claim 9, further comprising, in connection with the nibble control process:
generating a tuned resonator filter based on the wheel frequency data; and
applying the tuned resonator filter to the scaled steering wheel angle data to produce raw nibble control angle data.

12. The method of claim 11, further comprising, in connection with the nibble control process:
applying a phase lift scheduler to the wheel frequency data to determine phase lift data;
determining allpass edge frequency data based on the phase lift data and the wheel frequency data;
generating a tuned allpass filter based on the allpass edge frequency data;
applying the tuned allpass filter to the raw nibble control angle data to produce compensated nibble control angle data; and
applying nibble control gain data to the compensated nibble control angle data to produce the nibble control angle data.

13. The method of claim 9, wherein the actuator angle data is further based on detected wheel speed data or detected vehicle speed data associated with the position controlled steering system.

14. The method of claim 9, wherein the control signal is further based on detected actuator angle data associated with the actuator.

15. A non-transitory machine-readable storage medium comprising instructions that, when executed, cause a controller to at least:
determine actuator angle data based on steering wheel angle data associated with a steering wheel of a position controlled steering system;
determine nibble control angle data in connection with implementing a nibble control process, wherein the instructions, when executed, cause the controller, in connection with the nibble control process, to:
determine wheel frequency data based on detected wheel speed data or detected vehicle speed data associated with the position controlled steering system;
determine gain data by applying a gain scheduler to the wheel frequency data; and
apply the gain data to the steering wheel angle data to produce scaled steering wheel angle data, wherein the nibble control angle data is based on the scaled steering wheel angle data;
determine adjusted actuator angle data based on the actuator angle data and the nibble control angle data; and
generate a control signal based on the adjusted actuator angle data to apply a torque via an actuator of the position controlled steering system.

16. The non-transitory machine-readable storage medium of claim 15, wherein the instructions, when executed, cause the controller to implement the nibble control process to reduce steering nibble associated with the position controlled steering system.

17. The non-transitory machine-readable storage medium of claim 15, wherein the instructions, when executed, cause the controller, in connection with the nibble control process, to:
generate a tuned resonator filter based on the wheel frequency data; and
apply the tuned resonator filter to the scaled steering wheel angle data to produce raw nibble control angle data.

18. The non-transitory machine-readable storage medium of claim 17, wherein the instructions, when executed, cause the controller, in connection with the nibble control process, to:
apply a phase lift scheduler to the wheel frequency data to determine phase lift data;
determine allpass edge frequency data based on the phase lift data and the wheel frequency data;
generate a tuned allpass filter based on the allpass edge frequency data;
apply the tuned allpass filter to the raw nibble control angle data to produce compensated nibble control angle data; and apply nibble control gain data to the compensated nibble control angle data to produce the nibble control angle data.

19. The non-transitory machine-readable storage medium of claim 15, wherein the actuator angle data is further based on detected wheel speed data or detected vehicle speed data associated with the position controlled steering system.

20. The non-transitory machine-readable storage medium of claim 15, wherein the control signal is further based on detected actuator angle data associated with the actuator.

* * * * *